(12) United States Patent
Sandholm et al.

(10) Patent No.: US 8,494,935 B2
(45) Date of Patent: Jul. 23, 2013

(54) SYSTEM AND METHOD FOR PAYMENT RECONCILIATION AGAINST EXPRESSIVE CONTRACTS

(75) Inventors: Tuomas Sandholm, Pittsburgh, PA (US); David C. Parkes, Cambridge, MA (US); Craig E. Boutilier, Toronto (CA); Subhash Suri, Santa Barbara, CA (US); Jason J. Brown, Pittsburgh, PA (US); Luc H. Mercier, Pittsburgh, PA (US)

(73) Assignee: CombineNet, Inc., Pittsburgh, PA (US)

( * ) Notice: Subject to any disclaimer, the term of this patent is extended or adjusted under 35 U.S.C. 154(b) by 702 days.

(21) Appl. No.: 12/605,552

(22) Filed: Oct. 26, 2009

(65) Prior Publication Data

US 2010/0114784 A1    May 6, 2010

Related U.S. Application Data

(60) Provisional application No. 61/108,239, filed on Oct. 24, 2008.

(51) Int. Cl.
*G06Q 40/00* (2012.01)

(52) U.S. Cl.
USPC .......................................... 705/35

(58) Field of Classification Search
CPC ............................... G06Q 40/00; G06Q 50/00
USPC ................... 705/1–500; 709/1–89; 715/1–99
See application file for complete search history.

(56) References Cited

U.S. PATENT DOCUMENTS

| | | | |
|---|---|---|---|
| 7,403,911 B2 | 7/2008 | Guler et al. | |
| 2002/0087378 A1 | 7/2002 | Como | |
| 2002/0111894 A1 | 8/2002 | Stevens | |
| 2002/0111897 A1 | 8/2002 | Davis | |
| 2002/0143692 A1 | 10/2002 | Heimermann et al. | |
| 2004/0039680 A1 | 2/2004 | Horch et al. | |
| 2004/0167789 A1 | 8/2004 | Roberts et al. | |
| 2004/0172321 A1* | 9/2004 | Vemula et al. | 705/8 |
| 2004/0186765 A1 | 9/2004 | Kataoka | |
| 2004/0210334 A1 | 10/2004 | Tateishi et al. | |
| 2006/0136324 A1 | 6/2006 | Barry et al. | |
| 2007/0073431 A1 | 3/2007 | Roumeliotis et al. | |
| 2008/0162285 A1 | 7/2008 | Tulloch et al. | |
| 2009/0150304 A1* | 6/2009 | Hahn-Carlson et al. | 705/400 |
| 2010/0114784 A1* | 5/2010 | Sandholm et al. | 705/80 |
| 2011/0131114 A1* | 6/2011 | Al-Mubarak et al. | 705/27.1 |

OTHER PUBLICATIONS

Cms staff, 2007 Part D Payment Reconcilitation, 2007, government, cms, web, 1-8.*

* cited by examiner

*Primary Examiner* — Marissa Liu
(74) *Attorney, Agent, or Firm* — The Webb Law Firm

(57) ABSTRACT

In a computer-implemented method of conducting expressive payment reconciliation, a purchase transaction is stored in a computer storage accessible to a processor. The processor identifies a contract against which the purchase transaction is made and a first payment amount for the purchase transaction. Contract data is stored in the computer storage and the processor determines a second payment amount for the purchase transaction based on at least one good or service associated with the purchase transaction and the data about the contract. In response to a difference in the first and second payments, the processor either stores computer storage a modified invoice with a modified payment amount, stores in the computer storage a reconciliation payment equal to the payment difference; outputs over a computer network an explanation of the modified payment; or outputs over a computer network a dispute notification.

20 Claims, 4 Drawing Sheets

Contract Compliance

Contract Execution

Procurement Strategy Optimization

SYSTEM AND METHOD FOR PAYMENT RECONCILIATION AGAINST EXPRESSIVE CONTRACTS

CROSS REFERENCE TO RELATED APPLICATION

The present invention claims priority from U.S. Provisional Patent Application No. 61/108,239, filed Oct. 24, 2008, which is incorporated herein by reference.

BACKGROUND OF THE INVENTION

Purchase Transaction:

A purchase transaction is a transaction between two parties related to one purchasing a good or service to the other. The complete purchase is constituted of one or several transactions. The following are examples of purchase transactions: a purchase order, in which the buyer declares its intention make a purchase to the supplier; a bill of lading, by which the seller claims to have delivered the ordered goods or services; an invoice, by which the seller inform the buyer of the due amount; and a payment, by which the buyer compensate the seller for the goods or services Procurement Contracts:

Most business-to-business transactions are ruled by contracts. A procurement contract is a contract between two parties, one referred to as the seller, the selling party, the supplier, or the vendor, and the other referred to as the buyer, the buying party, the client, or the customer. A procurement contract give the buyer, under certain conditions, the right to place purchase orders to the suppliers, and the obligation, under certain conditions, for the supplier to fulfill these orders by delivering the requested goods or services. A procurement contract specifies how the payments between the parties as a compensation for the goods or services delivered should be computed. The goods or services that are the object of the contract are called the contracted items.

Note that in some industries, it is custom to call "procurement contract" a document that contains a number of terms and conditions between the parties, but that does not contain the list of items that are under contract, nor, a fortiori, their prices. Such a contract is meant to be accompanied by another document, sometimes called a blank purchase order or pricing schedule, that does specify the items and how to compute payments. This is not the sense in which we use the term procurement contract in this document: we will always mean a complete document, specifying the parties, the terms and conditions, the contracted items, and how to compute payments.

The rules that determine the payments between the parties vary widely in sophistication. At the simplest, contracts may simply list unit prices for each of the contracted items. Sometimes, these prices may depend on external indices, such as commodity price indices.

Contracts may also include conditional offers, which are clauses that tie a trigger condition to an effect. For example, the ongoing prices may drop as a result of the cumulative past volume crossing a threshold.

Spot Markets:

Businesses also make purchases to supplier with whom they do not have a procurement contract. This can be for a variety of reasons. For example, when the supplies they need are standard enough, they may choose not to contract any supplier so as to be able to chose the immediate cheapest for each transaction. Or it may be that the volumes to be purchased are low enough that the costs associated with the contracting process become prohibitive. In some circumstances, it may be that the buyer has one or more contracted suppliers for a given good or service, but that at a specific time the contracted suppliers are not able to provide the contracted good or services. In this case, the buyer will often make an exceptional purchase with a non-contracted supplier.

The market for one-time, immediate or near-future deliveries of goods or services, outside of any procurement contract, is called the sport market for these goods or services. The prices of these goods or services on the spot market are called the spot prices.

Expressive Sourcing:

Sourcing is the process by which a firm or other organization makes strategic decisions about which suppliers to contract with for goods, services, and other items that are purchased on an ongoing basis. In addition to determining which suppliers, it is during sourcing that a firm makes decisions about the kinds of goods and services to buy, together with the cost basis for purchases along with necessary contracting details (e.g., terms of payment, delivery times and so on.)

For example, a hospital system may decide to enter into an exclusive contract with a new supplier of artificial knees, while at the same time deciding to split an allocation for generic pharmaceutical supplies between two suppliers to mitigate risk while still taking advantage of volume discounts. A large multi-national company may source sea freight capacity and trucking capacity, perhaps adopting new shipping routes in the process if this network redesign provides cost benefits.

Sourcing is a strategic decision, in the sense that it is a complex, multi-faceted decision and one without an immediate impact on the "bottom line" of a business because no goods are purchased during the sourcing itself. Rather, sourcing determines winning suppliers along with contracts that will then executed against during procurement. That is, the outcome of a sourcing event is a set of procurement contracts. In comparison, procurement—the process of actually ordering goods and services, making payments and receiving delivery of goods and services—is tactical in that it directly impacts day-to-day operations of a business and incurs direct costs to the bottom line.

Sourcing was traditionally a manual process by which a sourcing team would negotiate deals through discussion and exchange of proposals and counterproposals, or by otherwise issuing a request for proposal (RFP) from prospective suppliers. The advent of the Internet has facilitated the use of electronic markets to dramatically improve the efficiency of sourcing. Businesses are moving to electronic sourcing (e-Sourcing), electronic contract management, and electronic procurement practices in hopes of reducing or eliminating cost from the procurement process. Early systems provided the ability to easily run "reverse auctions", i.e., an auction with one buyer and competing sellers, where a sourcing contract was allocated to the buyer with the lowest price bid. More elaborate systems allowed for scoring rules to make adjustments to capture buyer preferences, for example for one supplier over another.

A significant advance in recent years is provided by expressive sourcing, in which many different kinds of goods and services can be sourced at the same time and with optimization used to determine the optimal outcome of a sourcing event. Rather than pre-bundling goods and running one reverse auction for each bundle of goods (e.g., all surgical knees), the use of expressive sourcing allows for surgical devices, generic drugs, and other medical suppliers to be flexibly sourced. Through appropriately designed bidding languages each supplier can submit bids on the goods and services that it wants to supply, and these bids can then be combined at the end of the auction with optimization used to determine the set of winning suppliers and an allocation of goods to suppliers to maximize business value to the buyer.

The bid of a supplier can be constructed in an expressive language that allows for side-constraints, volume-based discounts, and other adjustments. For example, the bid from a supplier might include the following kinds of discounts and constraints: multi-item quantity discounts; e.g., if 1000 units of items A and B are procured then the unit price will fall by 5% on future purchases of A, B and C; multi-item dollar-volume discounts; e.g., if $100,000 of items A and B are procured then the unit price will fall by 5% on future purchases of A, B and C; multi-item capacity constraints; e.g., I cannot supply more than 25 shipments in total from ports A or B to C or D; multi-item market-share discounts; e.g., if my market-share of items A and B is at least 20% then I will provide a rebate of $50,000; growth-based discounts; e.g., if the number of units of item A that I sell increases by 5% from this year then I will provide a rebate of $10,000; multi-item single-order tiered pricing; e.g., if 1000 units each of items A and B are purchased in a single purchase order then the per-unit price is 5% less; and package bids; e.g., if you buy an A to B trip at the same time as a B to A trip then my price is 10% less on that round trip (because the trucker avoids the "dead-head" cost.)

The sourcing event itself may also be multi-stage, with a second and subsequent round of bid collection from prospective suppliers.

The outcome of a sourcing event specifies both an allocation of goods to each supplier (i.e., the quantity of each good or service to be purchased from each supplier during the course of a contract) the set of winning suppliers, and the bids provided by each winning supplier. This bid information includes for example all base prices along with any additional expressive bid information, such as described in the examples above.

In addition to specifying projected quantities of goods and services that will be purchased during the term of a contract, the buyer (e.g., the sourcing team) is also able to provide adjustments and constraints that are considered when determining the outcome of the sourcing event. Inputs provided by the buyer can include bid adjustments (for example imposing a 3% downward price adjustment on bids from incumbent suppliers to promote incumbents), or constraints (such as requiring a split allocation against two or more suppliers, fixing some part of the allocation and not leaving it flexible, or a max-supplier constraint).

A computational optimization procedure is used to determine the outcome of a sourcing event, in a process referred to as winner determination. This is the process by which the outcome of an event is determined. The final outcome may be reached through an interactive process in which a sourcing team explores the impact of different (bid-taker) adjustments and constraints, with the optimization used interactively to determine the outcome.

Procurement Plans:

Typically, the sourcing and legal teams of a buyer do more than contracting suppliers. They also generate some information related to the intended or expected use of these contracts. A procurement plan is all the information possessed or produced by the buyer that is related to the future procurement to be made in connection with the procurement contracts A procurement plan can also include information related to the future procurement by the buyer against non-contracted suppliers. The nature of this information can vary widely. A plan for future procurement is often made in relation to a forecast of the future quantities of the various items to be ordered, across all contracted suppliers for each item. For example, "we forecast we will buy 1000 units of item A in the year to come". A few examples of procurement plans include:

- an allocation of forecasted future quantities of items (e.g., goods or services) to the various contracted suppliers, as absolute. For example, "we forecast we will buy 1000 units of item A in the year to come, and we intend to order 350 units from supplier X and 650 from supplier Y". These quantities—here 350 and 650—are the target quantities: the goal is that the actual quantities should be close to the target ones.
- an allocation of forecasted future quantities of items (e.g., goods or services) to the various contracted suppliers, as fractions of the actual total quantities. For example, "we forecast we will buy 1000 units of item A in the year to come, and we intend to order 35% of the actual quantity from supplier X and 65% from supplier Y". These fractions—here 35% and 65%—are target fractions. The goal is that the actual fractions should be close to the target ones.
- some more or less flexible guidelines about how to use these contracts. For example, "for item A, whenever possible, prefer supplier X to supplier Y".
- Some strict rules about how to use these contracts. For example, "when ordering item A, always ask supplier X first. Only if supplier X is unable to deliver the requested goods can supplier Y be given an order."
- Some rules about how to use a contract, making explicit use of a target allocation specified by a procurement plan. For example, if the sourcing team decided to allocate 35% of item A to supplier X and 65% to supplier Y, such a rule could be: "if the year-to-date fraction of A ordered from X is greater than 45%, place any order of A to Y. If it is less than 25%, place any order of A to X. Otherwise, use your personal judgment."

This wide diversity should not hide the common characteristics of all these plans: they all concern the future use of contracts, parameterizing different methods of future procurement that are operable to the plan. Typically, this information is kept privately by the buyer, although he may choose to share some of it to some suppliers (or sellers).

Procurement Systems:

At the end of a sourcing event the buyer enters into contracts with the suppliers for items and pricing under certain terms and conditions. Around 75% of all business to business transactions are governed by formal contracts or trade agreements with a typical Fortune 100 company maintaining between 20,000 and 40,000 active contracts. Contracts capture negotiated terms with suppliers, which may not be those exactly identified in a sourcing event. Contracts also provide a framework to measure operational and financial performance, while forming the basis for regulatory compliance such as Sarbanes-Oxley Act of 2002 (SOX).

Contract management systems provide a specialized digital document repository and also allow for the management of the "red-lining" process of contract negotiation and have sections for disclaimers and so on. Current contract management systems support "line-item prices", i.e. fixed prices for different units of various goods and services. Each contract at a minimum has: a term (i.e., a range of valid dates), a buyer, a supplier, and a description of prices (e.g., line-item prices) for purchasing the items (e.g., goods, services) from the supplier for the term. The current state-of-the-art contracting systems do not typically capture all of the expressive or conditional offers that may be selected at the outcome of sourcing and the associated expressive contracts entered into with suppliers. For example, most contract management systems fail to implement line-item volume quantity discounts, line-item dollar-volume discounts, quote-order line-item volume discounts, multi-item capacity, multi-item quantity volume discounts, split allocations, and so on.

Upon completion of the contracting process the procurement system is configured. This is the system used by buyers within an organization to purchase goods and services on an ongoing basis. The procurement system is typically populated at present with a line-item listing of the prices to be paid for an item from a supplier. But current procurement systems are not able to receive as an input the various forms of expressive offers, and associated expressive contracts, that are generated as the result of the optimization-based expressive auctions used frequently within sourcing.

This mismatch in expressiveness—between sourcing and procurement—is a source of inefficiency in current procurement processes. An example of such inefficiency resulting from non-expressive procurement processes, i.e., one with non-expressive contracts, is that suppliers should be expected to anticipate that volume discounts and other forms of expressiveness that are provided within an expressive sourcing event will be provided to buyers based only on forecasted quantities upon conclusion of sourcing, which may not in fact be realized. In the status quo, the expressive bids, for example volume discounts that trigger at different volume thresholds, are sometimes "flattened out" to a single line-item price based on this forecast. The status quo at present is that upon the outcome of a sourcing event the Chief Procurement Officer (CPO) within an organization reports a particular savings achieved, while the Chief Financial Officer (CFO) at the end of the year does not eventually see the savings. The mismatch could be for reasons not related to suboptimal procurement decisions, for example because the quantity of materials purchased was higher than anticipated, because the spot price of materials changed, or because an existing item was replaced with a different item and possibly at a different quantity. But this can also frequently occur because a volume discount was not realized because procurement was made to the wrong contract, or because it was made to the correct contract but without triggering a new price point to be updated within the procurement system. This difference between the savings numbers considered by the CPO and the CFO is the "savings leakage".

The savings leakage can increase as the commodities become more strategic and complex. Price discounts and other complex offers that are negotiated via the sourcing event may be neglected during procurement. For example, whereas the intent of a sourcing team may be that procurement of one kind of good should be from supplier 1 and not supplier 2 because it will trigger a volume discount at some future aggregate spend quantity, this information may not be available to individuals involved in procurement. It often takes an audit once a month to catch the fact that a price change should have occurred. Once found, the buyer must prove to the supplier that the new price has been achieved and then must get the supplier to update pricing. This often leads to a 30-120 day delay in getting the new lower pricing. This situation is compounded by the fact that typically the procurement systems, sourcing systems, and finance systems (e.g., accounts-payable, accounts-receivable) are not interconnected, and moreover that in many complex organizations there are many different systems for one purpose (e.g., multiple purchase order applications). This leads to an inability to track contract utilization and makes supplier performance tracking cumbersome and time-consuming.

Contract Compliance:

Contract compliance is a general term that is traditionally used to describe the process by which procurement decisions are validated against the contracts generated upon the completion of a sourcing event. The current state of the art in contract compliance is to provide tracking of procurement decisions and compare against quantity and price projections in order to monitor the "savings capture," i.e., what amount of identified savings from sourcing are actually achieved or realized during procurement.

Current compliance systems are designed to perform monitoring of the purchase orders that are generated by procurement systems, and will in turn generate reports that provide information about, without limitation, the following kinds of concerns:

Maverick Buying: This occurs when a buyer purchases something off contract. A purchase order contains an item that is under contract, but the purchase order is not associated with this contract or the item is under a contract with a different supplier. The end effect is that the contracted price benefits may not be achieved.

Purchase Order-Contract Price Discrepancy: The price that goes out on a purchase order does not match the contract price.

Invoice-Purchase Order Price Discrepancy: The price from the supplier on the invoice does not match the price on the purchase order.

Contract utilization: Is the spend consistent with the forecasted volume?

However, current contract compliance systems cannot handle the semantics of expressive contracts.

In monitoring procurement decisions, compliance systems typically monitor the transaction network over which information such as purchase orders flow. Information may be in the form of contract XML (cXML) flowing over electronic clearing networks, or electronic data interchange (EDI) standards over a closed network, or via purchase orders (POs) and invoices exchanged between the buyer and the supplier. A PO originates from the procurement system and is sent back-and-forth with the supplier until approved and accepted. When the items are delivered, the supplier sends an invoice for the PO. This invoice is again exchanged back and forth with the buyer until it is approved and accepted.

Current compliance systems track purchases associated with POs and are designed to try to work around problems that can occur, such as POs with missing material numbers or with only free-text descriptions. In some cases, POs may also be missing completely in which case information from invoices can take their place. In some cases there may be no invoice at all, but just purchasing information provided to a compliance system by a supplier. All of this affects the degree of accuracy possible in tracking the state of contracts. Methods from artificial intelligence are sometimes adopted; e.g., to perform automated classification of items into different spend categories and to allow for reporting via this taxonomy.

SUMMARY OF THE INVENTION

The present invention is a system and method for compliance, execution and reoptimization (CER) against expressive contracts with suppliers, for example contracts that are created in a sourcing event.

By monitoring the sequence of procurement decisions made within an organization, such as a firm, the execution state of each contract can be tracked. The execution state is a record of all pertinent information to determine both the correct cost of completed transactions and to support optimal future procurement and sourcing decisions. One exemplary, nonlimiting, way to track this procurement information is by monitoring the flow of purchase orders within a firm's accounts payable system.

The CER system and method also collects additional relevant information, including for example current spot market or catalogue prices for items, as well as projections on the quantities of various goods and services that are expected to be required in the future.

Given information about the state of each contract along with this additional information, the CER system and method provides a number of functions. First, the CER system and method provides a means for contract compliance through optimal reconciliation. Verifying that the correct payments have been made for completed transactions can involve optimization, for example determining which of a set of possible discounts were valid and considering other constraints with complex (expressive) contracts. This process of ensuring compliance through optimal reconciliation serves the purpose of preventing "savings leakage"—wherein the current state of the art systems for procurement are unable to implement the savings available in the semantics of complex contracts.

Second, the CER system and method provides a means for contract compliance through optimal execution against expressive contracts. The problem addressed is one of myopic procurement decisions, for example where a purchasing decision is made on the basis of the current contract price and without considerations about either volume discounts that could trigger based on aggregate purchases over some period of time. This could make the supplier that appears (myopically) cheaper to be more expensive over the long-run. Another example is when an organization has contracted with multiple firms to provide for supply chain robustness against failure or other unexpected events, but one (perhaps cheaper) contract is myopically executed against by a procurement team. The decision about optimal execution can also require optimization, factoring both constraints, adjustments and other strategic information in regards to favoring or disfavoring one supplier over another, and in addition condition future purchase projections.

Third, the CER system and method can support the process of contract reoptimization, both in reoptimizing an allocation of future purchases against existing contracts and also determining when to accept new contracts or use a sourcing event to collect additional bids from suppliers (current or prospective). The need for contract reoptimization may be triggered by new information, for example about spot prices or revised demand projections, together with new offers from suppliers. Rather than leverage optimization for strategic decision making within sourcing events, the system brings the benefits of optimal decision making to a sourcing team on a continual basis given current and prospective contracts and the state of current contracts. Example decisions can include a shift of allocation among existing suppliers, the substitution of one supplier for a new supplier, and so forth. Contract reoptimization provides for a transformation from an event-based sourcing process to a continual sourcing process.

Desirably, the CER system inter-operates with existing procurement systems by monitoring transactions on a procurement transaction network and performing real-time compliance, checking for maverick buying and validating payments against contracts. The system can be used to generate "issues" that may be informational, or require an action, these issues routed via a workflow system to appropriate users within a film or organization. These issues can also be generated as and when transactions (typically, purchase orders) cannot be correctly identified, so that data is cleaned in real-time.

Expressive Payment Reconciliation:

The invention is a computer-implemented method of conducting expressive payment reconciliation for a buyer against expressive contracts on goods or services comprising: (a) storing in a computer storage accessible to a processor of a computer data associated with a purchase transaction, wherein the purchase transaction data includes information about at least the following: a seller and a set of at least one good or service, each of which has a quantity associated therewith; (b) the processor identifying a contract against which the purchase transaction is made and a payment amount for the purchase transaction; (c) storing in the computer storage data about the contract, where this contract data specifies at least one good or service, a seller, and a payment rule to determine the payment for the purchase of at least one quantity of at least one good or service that includes at least one of the following: a within-order package price; a within-order tiered multi-item average unit price; and a within-order tiered multi-item marginal unit price; (d) a processor of the computer determining a second payment amount for the purchase transaction in step (a) based on the set of the at least one good or service in step (a) and the data about the contract in step (c); (e) in the event that the first payment amount and second payment amount are different, and in response to the processor automatically approving a reconciliation action subject to one or more predetermined rules or the processor receiving an external approval of a reconciliation action, the processor taking one of the following actions: creating a modified invoice with a modified payment amount; triggering a reconciliation payment equal to the payment difference; transmitting over a computer network an explanation of the modified payment; and transmitting over a computer network a dispute notification.

Step (d) can include, if the payment determined in step (c) is different from the payment amount of the purchase transaction in step (a), then issuing a notification to a user of this difference, and receiving approval or lack of approval from this user.

The data associated with the purchase transaction in step (a) can include information about one of the following elements: a reference to the contract against which the purchase transaction is made, the time of order, the delivery terms for the at least one good or service, and the payment terms.

At least part of the data stored about the purchase transaction in step (a) an be based on at least one of the following sources: an invoice; a bill of lading; and a record of payment.

The invention is also a computer-implemented method of conducting expressive payment reconciliation for a buyer against expressive contracts on goods or services comprising: (a) storing in computer storage accessible to a processor of a computer data associated with a purchase transaction, wherein the purchase transaction data includes information about at least the following: a seller; and a set of at least one good or service, each of which has a quantity associated therewith; (b) the processor identifying a first contract against which the purchase transaction is made and a first payment amount for the purchase transaction; (c) storing in computer storage data about the first contract, wherein this data specifies at least the following: at least one good or service, a payment rule to determine the payment for the purchase of at least one quantity of at least one good or service, information about a plurality of purchases made against the contract, and a trigger condition and associated effect, wherein the trigger condition is responsive to the information about the plurality of purchases, and the effect causes one of the following: a payment to occur, a payment associated with the purchase transaction in step (a) to change, a future payment to change, a future payment contingent on a future purchase transaction to change, or a constraint on allowable purchases to change; (d) responsive to the purchase transaction data in step (a) and the data about the first contract in step (c), the processor determining a second payment amount for the purchase transaction; (e) in the event that the first payment amount and second payment amount are different, and in response to the processor automatically approving a reconciliation action subject to one or more predetermined rules or the processor receiving an external approval of a reconciliation action, the processor taking one of the following actions: creating a modified invoice with a modified payment amount; triggering a reconciliation payment equal to the payment difference; transmitting over a computer network an explanation of the modified payment; and transmitting over a computer network a dispute notification.

Step (e) can include, if the payment determined in step (d) is different from the payment amount associated with the purchase transaction in step (a), then issuing a notification to a user of this difference, and receiving approval or lack of approval from this user.

The data associated with the purchase transaction in step (a) can includes at least one of the following: a reference to the contract against which the purchase transaction is made, an explanation of the payment amount associated with the purchase transaction, the time the order was placed, the delivery terms for the at least one good or service, the payment terms.

At least part of the data stored about the purchase transaction in step (a) can be based on at least one of the following sources: an invoice; a bill of lading; and a record of payment.

The trigger condition can include at least one of the following: the volume quantity of at least one good or service, summed over a plurality of purchase transactions associated with the first contract exceeds a quantity threshold; the monetary value of at least one good or service, summed over the payments of each of a plurality of purchase transactions associated with the first contract exceeds a value threshold, where the payment in a purchase transaction is specified in a purchase transaction or determined by the payment rule associated with the first contract; the volume quantity of a first set of at least one good or service, summed over a first plurality of purchase transactions associated with the first contract, when calculated as a fraction of the volume quantity of a second set of at least one good or service, summed over a second set of at least one purchase transaction, exceeds a fractional-quantity threshold; and the monetary value of a first set of at least one good or service, summed over a first plurality of purchase transactions associated with the first contract, when calculated as a fraction of the monetary value of a second set of at least one good or service, summed over a second set of at least one purchase transaction, exceeds a fractional-value threshold.

The effect associated with the trigger condition of the first contract can include at least one of the following: a one-time payment due by the buyer to the seller associated with the first contract or from the seller associated with the first contract to the buyer; a one-time payment between the buyer and the seller associated with the first contract, where the amount and due date of this payment are responsive to the history of purchases made in connection with the first contract; a one-time payment between the buyer and the seller associated with the first contract, where the amount and due date of this payment are responsive to the history of purchases made in connection with the first contract, and to external data that is available to both the buyer and the seller and whose origin is specified within the first contract, a modification of the payment for future purchases on at least one good or service; a modification of the payment for future purchases on at least one good or service, where the modification is responsive to the payment amount for the good or service when the trigger condition is satisfied, and responsive to the history of purchases made in connection with the first contract; a modification of the payment for future purchases on at least one good or service, where the modification is responsive to the payment amount for the good or service when the trigger condition is satisfied, and responsive to the history of purchases made in connection with the first contract, and to external data that is available to both the buyer and the seller and whose origin is specified within the first contract; and a modification of the payment to be made for a purchase transaction that is associated with the trigger condition.

The external data can be a price index, a tariff, or a financial index.

The trigger condition and associated effect associated with the first contract can be one of the following: an across-order multi-item dollar-volume anticipated discount, an across-order multi-item dollar-volume state-based discount, an across-order multi-item dollar-volume rebate, an across-order multi-item quantity-volume anticipated discount, an across-order multi-item quantity-volume state-based discount, an across-order multi-item quantity-volume rebate, an across-order multi-item market share anticipated discount, an across-order multi-item market share state-based discount, an across-order multi-item market share rebate, an across-order multi-item growth-based anticipated discount, an across-order multi-item growth-based state-based discount, and an across-order multi-item growth-based rebate, The second payment amount for the purchase transaction can be based on a first forecast of a future quantity of at least one good or service to be purchased against the first contract.

The trigger condition and associated effect stored in computer storage and associated with the first contract can includes one of the following: an across-order multi-item dollar-volume anticipated discount, an across-order multi-item quantity-volume anticipated discount, an across-order multi-item market share anticipated discount, an across-order multi-item growth-based anticipated discount, and where in step (d), in determining a second payment for the purchase transaction that is responsive to the forecast of a future quantity of at least one good or service to be purchased against this first contract, the payment for the current transaction depends on whether or not the trigger condition for a discount or tiered price is forecasted to occur before the end of the term of the contract.

The processor determines the first forecast of a future quantity of at least one good or service to be purchased against the first contract by: storing in computer storage data about a set of at least one additional contract, distinct from the first contract, where the data includes information about at least a seller and at least one good or service, storing in computer storage a second forecast of the future quantity of at least one good or service to be purchased, storing in computer storage a first procurement plan for future procurement against at least one of the first contract and set of at least one additional contracts, and responsive to the procurement plan and to the second forecast of the future quantity of at least one good or service to be purchased, a processor determining the first forecast of the future quantity of at least one good or service to be purchased against the first contract.

The processor can select a first plan for future procurement in a way that is responsive to the data about the first contract and the set of at least one additional contract, and to the forecast of the future quantity of at least one good or service to be purchased.

The procurement plan can include at least one of the following: a target quantity for at least one good or service to be purchased in connection with a contract during a time interval; a target quantity fraction for at least one good or service to be purchased in connection with a contract during a time interval relative to all purchases of the same or substitutable good or service; a target monetary amount for at least one good or service to be purchased in connection with a contract during a time interval; a target monetary amount fraction for at least one good or service to be purchased in connection with a contract during a time interval relative to all purchases of the same or substitutable good or service; a specification of at least one purchase order such that in the event that the purchase order occurs then procurement against a particular contract is mandatory; a specification of at least one purchase order such that in the event that the purchase order occurs then procurement against a particular contract is recommended; a specification of a plurality of purchase orders and an alternation, such that in the event that the plurality of purchase orders occurs, then procurement of each purchase order against an alternation between a plurality of contracts is mandatory; and a specification of a plurality of purchase orders and an alternation, such that in the event that the plurality of purchase orders occurs, then procurement of each purchase order against an alternation between a plurality of contracts is recommended.

The selection of the first plan for future procurement can be based on at least one business rule that can be stored in computer storage.

The business rule can be one of the following: a split allocation constraint, a price adjustment favoring or penalizing a seller, a constraint on a maximum number of sellers to use for procurement, a constraint on a minimum number of sellers to use for procurement, a constraint on a minimum quantity of goods or services to be purchased in the future from a seller, a constraint on a minimum monetary amount of goods or services to be purchased in the future from a seller, a constraint on the maximum number of sellers under contract to which no future purchases will be made under a plan for future procurement, an adjustment of the payment for future purchase of at least one good or service associated with at least one contract over an interval of time, a constraint on a minimum quantity of goods or services to be purchased in the future from at least one seller over an interval of time, a constraint on a minimum monetary amount of goods or services to be purchased in the future from a seller, a constraint on a maximum quantity of goods or services to be purchased in the future from at least one seller over an interval of time, a constraint on a maximum monetary amount of goods or services to be purchased in the future from a seller, a constraint on the maximum number of sellers from which goods or services will be purchased according to a plan for future procurement over an interval of time, a constraint on the minimum number of sellers to which the volume of at least one good or service that will be purchased according to a plan for future procurement exceeds a given volume threshold, a constraint on the minimum number of sellers to which the monetary amount of at least one good or service that will be purchased according to a plan for future procurement exceeds a given monetary amount threshold, an internal cost to the buyer that is the effect of a trigger condition associated with a contract, and an internal cost to the buyer that is the effect of completing no future purchases with a seller under a plan for future procurement.

The first contract can be generated in a sourcing event in which a plurality of sellers compete through a bidding process to enter into contracts with the buyer for future procurement of at least one good or service.

The at least one business rule can be selected by in a way that is responsive to the business rules used by the buyer within a sourcing event in which a plurality of sellers compete through a bidding process to enter into contracts with the buyer for future procurement of at least one good or service.

The selection of the first plan for future procurement can be based on at least one of the following: the current value or a forecast on the future value for the spot price for at least one good or service, and the current value or a forecast on the future value of external data that is available to both the buyer and the seller of at least one contract, where the external data is specified within the contract.

The external data can be a price index, a tariff, or a financial index.

The selection of the first plan for future procurement can be made by the processor outputting a candidate plan and receiving a first business rule in response and selecting the first plan in a way that is responsive to this first business rule.

The invention is also a computer-implemented method of conducting expressive payment calculation against expressive contracts on goods or services, comprising: (a) storing in computer storage accessible to a processor of a computer data associated with a plurality of purchase transactions, wherein the data includes information about at least a quantity of at least one good or service; (b) for each purchase transaction in the plurality of purchase transactions in (a), the processor identifying a contract against which the purchase transaction is made; (c) for each contract identified in step (b), storing in computer storage data about at least the following: one good or service and a payment rule to determine the payment for the purchase of at least one quantity of the at least one good or service; (d) storing in computer storage additional data about a first contract from the set of at least one contract identified in step (b), where this data includes at least the following: information about a plurality of purchases made against the contract, and a trigger condition and associated effect, wherein the trigger condition is responsive to the information about the plurality of purchases, and the effect is to cause an immediate payment, change a payment associated with a purchase transaction, change a future payment or a future payment contingent on a future purchase transaction, or change a constraint on allowable purchases; (e) responsive to the data associated with the plurality of purchase transactions in step (a), the data associated with each contract identified in step (c), and the data about the first contract in step (d), the processor determining a first payment amount for each or all purchase transactions in the plurality of purchase transactions in (a); (f) responsive to the processor automatically approving a payment action subject to one or more predetermined rules or the processor receiving an external approval of a payment action, the processor taking one of the following payment actions: (i) creating an invoice with a payment amount responsive to the first payment amount determined in step (e) for at least one purchase transaction; (ii) creating a payment whose amount is responsive to the first payment amount determined in step (e) for at least one purchase transaction; and (iii) transmitting over a computer network an explanation of the payment.

Step (b) can include identifying a second payment amount for each or for all purchase transaction, wherein: in response to taking the payment action of step (f)(i), the processor determines the payment amount in the invoice based on the second payment amount on at least one purchase transaction;

and in response to taking the payment action step (f)(ii), the processor determines the payment amount based on the second payment amount on at least one purchase transaction.

The trigger condition of the first contract can include one of the following: a condition that is satisfied in the event that the volume quantity of at least one good or service, summed over a plurality of purchase transactions associated with the first contract exceeds a quantity threshold; a condition that is satisfied in the event that the monetary value of at least one good or service, summed over the payments of each of a plurality of purchase transactions associated with the first contract exceeds a value threshold, where the payment in a purchase transaction is specified in a purchase transaction or determined by the payment rule associated with the first contract; a condition that is satisfied in the event that the volume quantity of a first set of at least one good or service, summed over a first plurality of purchase transactions associated with the first contract, when calculated as a fraction of the volume quantity of a second set of at least one good or service, summed over a second set of at least one purchase transaction, exceeds a fractional-quantity threshold; and a condition that is satisfied in the event that the monetary value of a first set of at least one good or service, summed over a first plurality of purchase transactions associated with the first contract, when calculated as a fraction of the monetary value of a second set of at least one good or service, summed over a second set of at least one purchase transaction, exceeds a fractional-value threshold.

The effect associated with a trigger condition for the first contract can include at least one of the following: a one-time payment due by the buyer to the seller associated with the first contract or from the seller associated with the first contract to the buyer; a one-time payment between the buyer and the seller associated with the first contract, where the amount and due date of this payment are responsive to the history of purchases made in connection with the first contract; a one-time payment between the buyer and the seller associated with the first contract, where the amount and due date of this payment are responsive to the history of purchases made in connection with the first contract, and to external data that is available to both the buyer and the seller and whose origin is specified within the first contract, a modification of the payment for future purchases on at least one good or service; a modification of the payment for future purchases on at least one good or service, where the modification is responsive to the payment amount for the good or service when the trigger condition is satisfied, and responsive to the history of purchases made in connection with the first contract; a modification of the payment for future purchases on at least one good or service, where the modification is responsive to the payment amount for the good or service when the trigger condition is satisfied, and responsive to the history of purchases made in connection with the first contract, and to external data that is available to both the buyer and the seller and whose origin is specified within the first contract; a modification of the payment to be made for a purchase transaction that is associated with the trigger condition; and a modification to a capacity constraint that limits the quantity volume that a buyer can purchase on at least one good or service for future purchases.

The trigger condition and associated effect associated with the first contract can be one of the following: an across-order multi-item dollar-volume anticipated discount; an across-order multi-item dollar-volume state-based discount; an across-order multi-item dollar-volume rebate; an across-order multi-item quantity-volume anticipated discount; an across-order multi-item quantity-volume state-based discount; an across-order multi-item quantity-volume rebate; an across-order multi-item market share anticipated discount; an across-order multi-item market share state-based discount; an across-order multi-item market share rebate; an across-order multi-item growth-based anticipated discount; an across-order multi-item growth-based state-based discount; and an across-order multi-item growth-based rebate.

The plurality of purchase transactions in step (a) can include one of the following: all purchase transactions on at least one good or service completed over a fixed period in time; or all purchase transactions to at least one seller completed over a fixed period in time.

The first contract in step (d) can be generated in a sourcing event in which a plurality of sellers compete through a bidding process to enter into contracts with the buyer for future procurement of at least one good or service.

Determining the first payment amount for each purchase transaction in step (e) can be based on a first forecast of a future quantity of at least one good or service to be purchased against at least one contract in the set of at least one contract identified in step (b).

The processor determines the first forecast of a future quantity of at least one good or service to be purchased against the at least one contract by: storing in computer storage a second forecast of the future quantity of at least one good or service to be purchased, and storing in computer storage at least one additional contract, distinct from the set of at least one contract identified in step (b), responsive to the data about the set of at least one contract in step (b) and the at least one additional contract, and responsive to the forecast of the future quantity of at least one good or service to be purchased, selecting a first plan for future procurement against at least one contract from the set of at least one contract in step (b) and the at least one additional contract; and responsive to the first plan for future procurement, and the second forecast of the future quantity of at least one good or service to be purchased, determining the first forecast of the future quantity of at least one good or service to be purchased against the at least one contract.

The selection of the first plan for future procurement can be based on at least one business rule that can be stored in computer storage.

The at least one business rule can be selected in a way that is responsive to the business rules used by the buyer within a sourcing event in which a plurality of sellers compete through a bidding process to enter into contracts with the buyer for future procurement of at least one good or service.

The selection of a first plan for future procurement can be based on at least one of the following: the current value or a forecast on the future value for the spot price for at least one good or service; and the current value or a forecast on the future value of external data that is available to both the buyer and the seller of at least one contract, where the external data is specified within the contract.

The selection of the first plan for future procurement can be made by the processor outputting a candidate plan and receiving a first business rule in response and selecting the first plan in a way that is responsive to this first business rule.

In step (c), determining a payment for the purchase transaction, tree search algorithms are used to identify a correct payment.

In step (c), determining a payment for the purchase transaction, a set of if-then rules are used to identify a correct payment.

In step (d), determining a payment for the purchase transaction, tree search algorithms are used to identify a correct payment.

In step (d), determining a payment for the purchase transaction, a set of if-then rules are used to identify a correct payment.

In step (e), determining a payment for the plurality of purchase transactions, tree search algorithms are used to identify a correct payment.

In step (e), determining a payment for the plurality of purchase transactions, a set of if-then rules are used to identify a correct payment.

The contract identified in step (b) can be generated in a sourcing event in which a plurality of sellers compete through a bidding process to enter into contracts with the buyer for future procurement of at least one good or service.

The purchase transaction data can be determined by the computer processor in response to storing in the computer storage data about at least one of the following: an invoice; a bill of lading; and a record of payment.

At least part of the data stored about the first contract in step (c) can be based on at least one of the following sources: a supplier master list; an item master list; a suppler item price catalog; and a index price.

The information included in the data associated with the purchase transaction in step (a) can be based on at least one of the following: data validation; and data cleaning.

The information included in the data associated with the purchase transaction in step (a) can be generated through a process that includes at least one of the following: data validation; and data cleaning.

Historical data regarding a plurality of these contract reconciliation events can be stored in computer storage. The method can be responsive to the at least one of the following queries received from a user: the frequency of occurrence of a difference in payment in step (d) for a particular seller; the average dollar volume of difference in payment in step (d) for a particular supplier; the frequency of occurrence of a difference in payment in step (d) for a particular good or service; the average dollar volume of difference in payment in step (d) for a particular good or service; the frequency of occurrence of a difference in payment in step (d) for purchase transactions completed by a particular user; and the average dollar volume of difference in payment in step (d) of claim 1 for purchase transactions completed by a particular user.

The historical data can be stored in the computer storage.

Contract Execution:

The invention is a computer-implemented method of conducting contract execution against expressive contracts comprising: (a) storing in the computer storage accessible to a processor of a computer data about a plurality of contracts, wherein the data about each contract specifies at least the following: one good or service associated with the contract; a payment rule to determine a payment for the purchase of at least one quantity of at least one good or service under the contract; and a seller under the contract; and wherein the data about a first one of the contracts also specifies information about a plurality of purchases made against the contract, and a trigger condition and associated effect, wherein the trigger condition is based on information about the plurality of purchases, and the effect causes either: a payment to occur, a payment associated with a purchase transaction to change, a future payment or a future payment contingent on a future purchase transaction to change, or a constraint on allowable purchases to change; (b) storing in the computer storage data about a procurement plan; (c) storing in the computer storage data associated with a purchase request, wherein the purchase request data includes information about a first quantity of at least one good or service; (d) the processor of the computer determining a second quantity of one good or service and a second contract against which to complete the purchase request based on the following: the procurement plan in step (b), the data about the plurality of contracts, the trigger condition and associated effect, the plurality of purchases made against the first one of the contracts in step (a), and the quantity of at least one good or service in step (c); (e) in response to the processor automatically approving the second contract and the second quantity in step (d) subject to one or more predetermined rules or the processor receiving an approval of the second contract and second quantity, the processor causing a purchase order of the second quantity of the one good or service to be placed to the supplier associated with the second contract in step (d).

The second quantity in step (d) can be the same as the first quantity in step (c).

The procurement plan in step (b) can include at least one of the following: a target quantity for at least one good or service to be purchased in connection with a contract during a time interval; a target quantity fraction for at least one good or service to be purchased in connection with a contract during a time interval relative to all purchases of the same or substitutable good or service; a target monetary amount for at least one good or service to be purchased in connection with a contract during a time interval; a target monetary amount fraction for at least one good or service to be purchased in connection with a contract during a time interval relative to all purchases of the same or substitutable good or service; a specification of at least one purchase order wherein, when the purchase order occurs, then procurement against a particular contract is mandatory; a specification of at least one purchase order wherein, when the purchase order occurs, then procurement against a particular contract is recommended; a specification of a plurality of purchase orders and an alternation, wherein, when the plurality of purchase orders occurs, then procurement of each purchase order against an alternation between a plurality of contracts is mandatory; and a specification of a plurality of purchase orders and an alternation, wherein, when the plurality of purchase orders occurs, then procurement of each purchase order against an alternation between a plurality of contracts is recommended.

At least one of the plurality of contracts can be stored in the computer storage by the processor in response to a sourcing event that is run under the control of the processor, wherein the sourcing event includes a plurality of sellers competing through an electronic bidding process that is under the control of the processor to enter into at least one contract with the buyer for future procurement of at least one good or service.

The procurement plan in step (b) can be stored in the computer storage by the processor in response to the determination by a processor the computer of a procurement plan that depends on at least one of the following: a business rule, a forecast of a future quantity of at least one good or service to be purchased, and the plurality of contracts in step (a).

In step (d), the processor can further determine a third contract a third quantity of the same good or service as for the second quantity. In step (e), in response to the processor automatically approving the third contract and the third quantity from step (d) subject to one or more predetermined rules or the processor receiving an approval of the third contract, the processor can further cause a purchase order of the third quantity of the same good or service as for the second quantity to be place with the supplier associated with the third contract.

Step (c) can include the processor storing in the computer storage data associated with a plurality of purchase requests, wherein the data for each purchase request includes information about at least a quantity of at least one good or service.

The processor can determine in step (d) at least one second contract to which a second plurality of purchase requests selected from the plurality of purchase requests is associated. In step (e), in response to the processor can automatically approving the second contract subject to one or more predetermined rules or the processor receiving an approval of the second contract, the processor can cause a purchase order for at least one quantity of at least one good or service to be placed with the supplier associated with the second contract.

The second quantity of the one good or service in step (d) can different than the first quantity of the same good or service in the purchase request in step (c).

The second quantity of one good or service in step (d) can be for a good or service that does not appear in the purchase request data in step (c).

The second quantity of the one good or service can be determined based on at least one trigger condition and effect in the second contract.

The second contract against which to complete the purchase request based on the procurement plan in step (b) and the data about the plurality of contracts and the first one of the contracts in step (a) can be determined based on a forecast of a future quantity of at least one good or service to be purchased stored in the computer storage.

The processor can determine the second contract and the second quantity of one good or service subject to at least one of the following objectives: minimizing the estimated total payment made by the buyer for the forecast of a future purchase of goods or services to be purchased; and maximizing the estimated total value to the buyer, net of estimated total payment, for the forecast of future purchase of goods or services to be purchased.

The processor can determine the second contract and second quantity against which to purchase the at least one good or service of the purchase request in step (c) subject to the objective of minimizing the difference between the purchase request and the procurement plan in step (b).

The processor can determine the second quantity of one good or service subject to at least one of the following objectives: minimizing the estimated total payment made by the buyer for the forecast of a future purchase of goods or services to be purchased; and maximizing the estimated total value to the buyer, net of estimated total payment, for the forecast of future purchase of goods or services to be purchased.

The processor can determine the second quantity of one good or service subject to at least one of the following objectives: minimizing the estimated total payment made by the buyer for the forecast of a future purchase of goods or services to be purchased; and maximizing the estimated total value to the buyer, net of estimated total payment, for the forecast of future purchase of goods or services to be purchased.

The processor can determine the second contract subject to the purchase request in step (c) not being split across more than a maximum number of alternate contracts.

The trigger condition and effect associated with the first contract received in step (a) can include at least one of the following: an across-order multi-item dollar-volume anticipated discount, an across-order multi-item dollar-volume state-based discount, an across-order multi-item dollar-volume rebate, an across-order multi-item quantity-volume anticipated discount, an across-order multi-item quantity-volume state-based discount, an across-order multi-item quantity-volume rebate, an across-order multi-item market share anticipated discount, an across-order multi-item market share state-based discount, an across-order multi-item market share rebate, an across-order multi-item growth-based anticipated discount, an across-order multi-item growth-based state-based discount, and an across-order multi-item growth-based rebate The trigger condition can include at least one of the following conditions: the volume quantity of at least one good or service, summed over a set of at least one purchase transaction associated with the first contract, exceeds a quantity threshold; the monetary value of at least one good or service, summed over the payments of each purchase transaction of a set of at least one purchase transaction associated with the first contract, exceeds a value threshold, where the payment in a purchase transaction is specified in a purchase transaction or determined by the payment rule associated with the first contract; the volume quantity of a first set of at least one good or service, summed over a first set of at least one purchase transaction associated with the first contract, when calculated as a fraction of the volume quantity of a second set of at least one good or service, summed over a second set of at least one purchase transaction, exceeds a fractional-quantity threshold; and the monetary value of a first set of at least one good or service, summed over a first set of at least one purchase transaction associated with the first contract, when calculated as a fraction of the monetary value of a second set of at least one good or service, summed over a second set of at least one purchase transaction, exceeds a fractional-value threshold.

The effect can include at least one of the following: a one-time payment due by the buyer to the seller associated with the first contract or from the seller associated with the first contract to the buyer; a one-time payment between the buyer and the seller associated with the first contract, where the amount and due date of this payment are based on the history of purchases made in connection with the first contract; a one-time payment between the buyer and the seller associated with the first contract, where the amount and due date of this payment are based on the history of purchases made in connection with the first contract and on external data whose origin is specified within the first contract; a change of a payment for future purchases on at least one good or service; a change of a payment for future purchases on at least one good or service based on a payment amount for the good or service when the trigger condition is satisfied and on a history of purchases made in connection with the first contract; a change of a payment for future purchases on at least one good or service based on a payment amount for the good or service when the trigger condition is satisfied, on a history of purchases made, in connection with the first contract, and on external data that is specified within the first contract; a change of a payment to be made for a purchase transaction that is associated with the trigger condition; and a change of a capacity constraint that limits the quantity volume that a buyer can purchase on at least one good or service for future purchases.

The external data whose origin is specified within the first contract can be either a price index, a tariff, or a financial index.

The data associated with the purchase request in step (c) can further include at least one of the following: a unique identifier to the controlling contract, an explanation of the payment amount associated with the purchase request, and information pertaining to the time of order, delivery, or payment.

At least part of the data stored about the first contract in step (a) can be determined by the processor and depends on at least one of the following: a supplier master list, an item master list, a supplier item price catalog, and an index price.

The information included in the data associated with the purchase request in step (c) can be determined by the processor and can include at least one of the following: data validation, and data cleaning.

Data in regard to historical contract execution events can be stored in the computer storage. Output reports can be generated by the processor in response to one of the following:

frequency of purchase order modification for a particular supplier, average long-term dollar volume saved in purchase order modification for a particular supplier, average short-term dollar volume saved in purchase order modification for a particular supplier, frequency of purchase order modification for a particular good or service, average long-term dollar volume saved in purchase order modifications for a particular good or service, average short-term dollar volume saved in purchase order modifications for a particular good or service, frequency of purchase order modification for a purchase transactions completed by a particular user, average long-term dollar volume saved in purchase order modifications for purchase transactions completed by a particular user, and average short-term dollar volume saved in purchase order modifications for purchase transactions completed by a particular user.

The data in the database can be restricted by content to external requests that have correct credentials to access the content.

The one or more predetermined rules in step (e) can include at least one of the following: a difference between (i) an estimated total payment made by the buyer for the forecast of a future purchase of goods or services to be purchased under the procurement plan subject to the first quantity of one good or service in step (c) being purchased from the seller indicated in the purchase request and (ii) an estimated total payment made by the buyer for the forecast of a future purchase of goods or services to be purchased under the procurement plan subject to the second quantity of one good or service in step (d) is purchased from the second contract in step (d); and a difference between (i) the estimated total value to the buyer, net of estimated total payment, for the forecast of future purchase of goods or services to be purchased under the procurement plan subject to the first quantity of one good or service in step (c) being purchased from the seller indicated in the purchase request and (ii) the estimated total value to the buyer, net of estimated total payment, for the forecast of future purchase of goods or services to be purchased under the procurement plan subject to the second quantity of one good or service in step (d) is purchased from the second contract in step (d).

Reoptimization or Procurement Strategy Optimization:

The invention is a computer-implemented method of reoptimization or procurement strategy optimization for a buyer against expressive contracts on goods or services. The method comprises (a) storing in a computer storage accessible to a processor of a computer data about a plurality of contracts, wherein the data about each contract specifies at least the following: one good or service associated with the contract, a payment rule to determine a payment for the purchase of at least one quantity of at least one good or service under the contract, and a seller under the contract; and wherein the data about a first one of the contracts also specifies a trigger condition and an associated effect, wherein the effect causes at least one of the following: a payment to occur, a future payment to change, a future payment to change contingent on a purchase transaction, or a constraint on allowable purchases to change; (b) storing in the computer storage a forecast of a future quantity of at least one good or service to be purchased; (c) the processor of the computer determining a first plan for future procurement against at least one of the plurality of contracts in step (a) based on the good or service and the payment rule in step (a), the trigger condition and the associated effect in step (a), and the forecast in step (b); and (d) responsive to the processor automatically approving the first plan subject to one or more predetermined rules or the processor receiving an approval of the first plan, the processor causing the first plan to be adopted for future procurement.

The trigger condition can include at least one of the following conditions: the time of a purchase transaction occurs subsequently to a given point in time; the volume quantity of at least one good or service, summed over a set of at least one purchase transaction associated with the first contract, exceeds a quantity threshold; the monetary value of at least one good or service, summed over the payments of each purchase transaction of a set of at least one purchase transaction associated with the first contract, exceeds a value threshold, where the payment in a purchase transaction is specified in a purchase transaction or determined by the payment rule associated with the first contract; the volume quantity of a first set of at least one good or service, summed over a first set of at least one purchase transaction associated with the first contract, when calculated as a fraction of the volume quantity of a second set of at least one good or service, summed over a second set of at least one purchase transaction, exceeds a fractional-quantity threshold; and the monetary value of a first set of at least one good or service, summed over a first set of at least one purchase transaction associated with the first contract, when calculated as a fraction of the monetary value of a second set of at least one good or service, summed over a second set of at least one purchase transaction, exceeds a fractional-value threshold.

The data about the first contract can further include information about a history of purchases made in connection with the first contract, where the satisfaction of the trigger condition is based on said information.

The processor can determines the first plan subject to at least one of the following objectives: minimizing the estimated total payment made by the buyer for the forecast of future purchase of goods or services to be purchased under the first plan; and maximizing the estimated total value to the buyer, net of estimated total payment, for the forecast of future purchase of goods or service in to be purchased under the first plan.

The first plan adopted for future procurement in step (d) can include at least one of the following: a target quantity for at least one good or service to be purchased in connection with a contract during a time interval; a target quantity fraction for at least one good or service to be purchased in connection with a contract during a time interval relative to all purchases of the same or substitutable good or service; a target monetary amount for at least one good or service to be purchased in connection with a contract during a time interval; a target monetary amount fraction for at least one good or service to be purchased in connection with a contract during a time interval relative to all purchases of the same or substitutable good or service; a specification of at least one purchase order wherein, when the purchase order occurs, then procurement against a particular contract is mandatory; a specification of at least one purchase order wherein, when the purchase order occurs, then procurement against a particular contract is recommended; a specification of a plurality of purchase orders and an alternation, wherein, when the plurality of purchase orders occurs, then procurement of each purchase order against an alternation between a plurality of contracts is mandatory; and a specification of a plurality of purchase orders and an alternation, wherein, when the plurality of purchase orders occurs, then procurement of each purchase order against an alternation between a plurality of contracts is recommended.

The effect can include at least one of the following: a payment due by the buyer to the seller associated with the first contract or from the seller associated with the first contract to the buyer; a payment between the buyer and the seller associated with the first contract, where the amount and due date of this payment are based on the history of purchases made in connection with the first contract; a payment between the buyer and the seller associated with the first contract, where the amount and due date of this payment are based on the history of purchases made in connection with the first contract and on external data whose origin is specified within the first contract; a change of a payment for future purchases on at least one good or service; a change of a payment for future purchases on at least one good or service based on a payment amount for the good or service when the trigger condition is satisfied and on a history of purchases made in connection with the first contract; a change of a payment for future purchases on at least one good or service based on a payment amount for the good or service when the trigger condition is satisfied, on a history of purchases made in connection with the first contract, and on external data that is specified within the first contract; a change of a payment to be made for a purchase transaction that is associated with the trigger condition; and a change of a capacity constraint that limits the quantity volume that a buyer can purchase on at least one good or service for future purchases.

The external data whose origin is specified within the first contract can be either a price index, a tariff, or a financial index.

The method can further include: the processor receiving a second plan for future procurement against at least one of the plurality of contracts in step (a); and the processor determining the first plan for future procurement based one at least one of the following: a quantity difference of at least one good or service between the first plan and the second plan; and a quality difference between the first plan and the second plan. The quality of each plan for future procurement can be determined based on at least one of the following: an estimated total payment to be made by the buyer for the forecast of future purchase of goods or services to be purchased under the plan; and the estimated total value to the buyer, net of estimated total payment, for the forecast of future purchase of goods or service in claim 1 to be purchased under the plan.

The first plan can be transmitted over a computer network.

The method can further include: storing in the computer storage a second plan for future procurement against at least one of the plurality of contracts in step (a), wherein the one or more predetermined rules in step (d) includes at least one of the following: a quantity difference of at least one good or service between the first plan and the second plan; and a quality difference between the first plan and a second plan. The quality of each plan for future procurement can be determined by subject to at least one of the following: an estimated total payment to be made by the buyer for the forecast of future purchase of goods or services to be purchased under the plan; and the estimated total value to the buyer, net of estimated total payment, for the forecast of future purchase of goods or service to be purchased under the plan.

The method can further include: storing at least one business rule in computer storage; and the processor determines the first plan based on the business rule.

The business rule can be one of the following: a split allocation constraint; a price adjustment favoring or penalizing a seller; a constraint on a maximum number of sellers to use for procurement; a constraint on a minimum number of sellers to use for procurement; a constraint on a minimum quantity of at least one good or service to be purchased in the future from a seller; a constraint on a minimum monetary amount of at least one good or service to be purchased in the future from a seller; a constraint on the maximum number of sellers under contract to which no future purchases will be made under a plan for future procurement; an adjustment of the payment for future purchases of at least one good or service associated with at least one contract over an interval of time; a constraint on a minimum quantity of at least one good or service to be purchased in the future from at least one seller over an interval of time; a constraint on a maximum quantity of at least one good or service to be purchased in the future from at least one seller over an interval of time; a constraint on a minimum monetary amount of at least one good or service to be purchased in the future from at least one seller over an interval of time; a constraint on a maximum monetary amount of at least one good or service to be purchased in the future from at least one seller over an interval of time; a constraint on the maximum number of sellers from which goods or services will be purchased according to a plan for future procurement over an interval of time; a constraint on the minimum number of sellers to which the volume of at least one good or service that will be purchased according to a plan for future procurement exceeds a given volume threshold; a constraint on the minimum number of sellers to which the monetary amount of at least one good or service that will be purchased according to a plan for future procurement exceeds a given monetary amount threshold; an internal cost to the buyer that is the effect of a trigger condition associated with a contract; and an internal cost to the buyer that is the effect of completing no future purchases with a seller under a plan for future procurement.

At least one of the plurality of contracts can be stored in the computer storage in response to a sourcing event in which a plurality of sellers compete through a computer network bidding process to enter into at least one contract with the buyer for future procurement of at least one good or service.

The storage of the at least one contract in the computer storage in response to the sourcing event can be based on a business rule which is stored in the computer storage and which is utilized by the processor within the sourcing event.

The storage of the at least one business rule in the computer storage can be in responsive a sourcing event that utilizes the same or a different business rule, wherein the sourcing event includes a plurality of sellers competing through an electronic bidding process that is under the control of the processor to enter into at least one contract with the buyer for future procurement of at least one good or service.

The method can further include the processor determining the first plan in step (c) subject to a current value or a forecast on the future value for at least one of the following: a spot price for at least one good or service; and external data whose origin is specified within the first contract. The external data whose origin is specified within the first contract can be either a price index, a tariff, or a financial index.

The determination of the plan for future procurement in step (c) can be subject to business rules that are received from a user.

Step (c) can include: the processor outputting a candidate plan; the processor receiving a first business rule in response to outputting the candidate plan; and the processor determining the first plan subject to the first business rule.

The method can further include the processor determining the first plan in step (c) subject to at least one of the following:

a bid from a seller specifying at least one contract that the seller would be willing to enter into with the buyer; and at least one offer from a seller to modify at least one of the following: one of the trigger conditions, one of the effects, or a payment rule in a current contract.

The invention is also a computer-implemented method of procurement strategy optimization for a buyer against expressive contracts on goods or services. The method comprises: (a) storing in a computer storage accessible to a processor of a computer data about a plurality of contracts, wherein the data about each contract specifies at least the following: one good or service associated with the contract, a payment rule to determine a payment for the purchase of at least one quantity of at least one good or service under the contract, and a seller under the contract; and wherein the data about a first one of the contracts also specifies a trigger condition and an associated effect, wherein the effect causes at least one of the following: a payment to occur, a future payment to change, a future payment to change contingent on a purchase transaction, or a constraint on allowable purchases to change; (b) storing in the computer storage a forecast of a future quantity of at least one good or service to be purchased; (c) the processor of the computer determining a first plan for future procurement against at least one of the plurality of contracts in step (a) based on the good or service and the payment rule in step (a), the trigger condition and the associated effect in step (a), and the forecast in step (b); and (d) responsive to the first plan determined for future procurement determined in step (c), the processor: amending at least one contract stored in the computer storage in step (a), replacing at least one contract stored in the computer storage in step (a) with an amended form thereof, or storing one or more new contracts in the computer storage.

Step (c) can include the processor outputting information that depends on the first plan. Step (d) can include the processor receiving one of the following in response to outputting the information that depends on the first plan: the amendment to the contract stored in the computer storage in step (a); the amended form of the at least one contract stored in the computer storage in step (a); or the one or more new contracts.

The decision in step (d) to amend at least one contract stored in the computer storage can be based on at least one of the following: a spot price on at least one good or service; a forecast of a future spot price on at least one good or service; an estimate of bids received in a sourcing event; and an estimate of the payment rules, and trigger and effect conditions, in new contracts.

The method can further include: (e) storing in the computer storage a second plan for future procurement against at least one of the plurality of contracts stored in the computer storage, wherein the second plan is either determined by the processor or received by the processor from an external source and is based on the forecast in step (b); and (f) responsive to the processor automatically approving the second plan subject to one or more predetermined rules or the processor receiving an approval of the second plan, the processor causing the second plan to be adopted for future procurement.

The one or more new contracts in step (d) can be stored in the computer storage by the processor in response to a sourcing event that includes a plurality of sellers competing through a networked bidding process to enter into at least one contract with the buyer for future procurement of at least one good or service.

The first plan for future procurement and the second plan for future procurement can each include at least one of the following: a target quantity for at least one good or service to be purchased in connection with a contract during a time interval; a target quantity fraction for at least one good or service to be purchased in connection with a contract during a time interval relative to all purchases of the same or substitutable good or service; a target monetary amount for at least one good or service to be purchased in connection with a contract during a time interval; a target monetary amount fraction for at least one good or service to be purchased in connection with a contract during a time interval relative to all purchases of the same or substitutable good or service; a specification of at least one purchase order such that in the event that the purchase order occurs then procurement against a particular contract is mandatory; a specification of at least one purchase order such that in the event that the purchase order occurs then procurement against a particular contract is recommended; a specification of a plurality of purchase orders and an alternation, such that in the event that the plurality of purchase orders occurs, then procurement of each purchase order against an alternation between a plurality of contracts is mandatory; and a specification of a plurality of purchase orders and an alternation, such that in the event that the plurality of purchase orders occurs, then procurement of each purchase order against an alternation between a plurality of contracts is recommended.

The second plan in step (e) can be further based on: a quantity difference of at least one good or service between the first plan and the second plan; and a quality difference between the first plan and the second plan. The quality of each plan for future procurement can be determined based on at least one of the following: an estimated total payment to be made by the buyer for the forecast of future purchase of goods or services to be purchased under the plan; and the estimated total value to the buyer, net of estimated total payment, for the forecast of future purchase of goods or service to be purchased under the plan.

The second plan or an explanation thereof can be transmitted over a computer network to the buyer.

The one or more predetermined rules can be based on: a quantity difference of at least one good or service between the first plan and the second plan; and a quality difference between the first plan and the second plan. The quality of each plan for future procurement can be determined by at least one of the following: an estimated total payment to be made by the buyer for the forecast of future purchase of goods or services to be purchased under the plan; and the estimated total value to the buyer, net of estimated total payment, for the forecast of future purchase of goods or service to be purchased under the plan.

The method can further include storing at least one business rule in the computer storage, wherein the processor causes the second plan to be adopted for future procurement based on the business rule.

The second plan for future procurement can be determined subject to business rules that are received from the buyer.

The method can further include: the processor outputting a candidate plan; the processor receiving a first business rule in response to outputting the candidate plan; and the processor causing the second plan to be adopted subject to the first business rule.

The invention is also a computer-implemented method of procurement strategy optimization for a buyer against expressive contracts on goods or services. The method comprises: (a) storing in a computer storage accessible to a processor of a computer data about a plurality of contracts, wherein the data about each contract specifies at least the following: one good or service associated with the contract, a payment rule to determine a payment for the purchase of at least one quantity of at least one good or service under the contract, and a seller under the contract; and wherein the data about a first one of the contracts also specifies a trigger condition and an associated effect, wherein the effect causes at least one of the following: a payment to occur, a future payment to change, a future payment to change contingent on a purchase transaction, or a constraint on allowable purchases to change; (b) storing in the computer storage data regarding a first plurality of purchase transactions completed in the past by following a first procurement plan against the plurality of contracts; (c) storing in the computer storage information regarding elements of at least one purchase transaction of the first plurality of purchase transactions; (d) the processor determining a second plurality of purchase transactions subject to the following: a change to at least one but not all of the elements in step (c), a total cost to the buyer, the good or service and payment rule in step (a), the trigger condition and the associated effect in step (a), and the plurality of first purchase transactions in step (b); and (e) the processor storing in the computer storage a second procurement plan procurement plan against the plurality of contracts, wherein the second procurement plan can be determined subject to the first procurement plan and the second plurality of purchase transactions.

The at least one element in step (d) can be the name of the seller.

The at least one element in step (d) is a purchase order. The second plurality of purchase transactions in step (d) can be determined further subject to: the aggregate purchase of goods or services being the same as in the first plurality of purchase transactions, and at least one restriction on the allowable time period between the purchase of a good or service in the first plurality of purchase transactions and the purchase of the same good or service in the second plurality of purchase transactions.

The at least one element in step (d) is the time the purchase transaction was placed. The second plurality of purchase transactions in step (d) can be determined further subject to at least one restriction on the allowable time period between a time at least one purchase transaction was placed in the first plurality of purchase transactions and a time a corresponding purchase transaction is placed in the second plurality of purchase transactions.

The at least one element in step (d) can be a first good or service. The second plurality of purchase transactions in step (d) can be determined further subject to a substitution of a good or service in a purchase transaction of the second plurality of purchase transactions for the first good or service in a corresponding purchase transaction of the first plurality of purchase transactions.

The method can further include storing in the computer storage at least one business rule that imposes a constraint on the second plurality of purchase transactions.

DETAILED DESCRIPTION OF THE INVENTION

The present invention will be described with reference to the accompanying figures.

Figure 1:
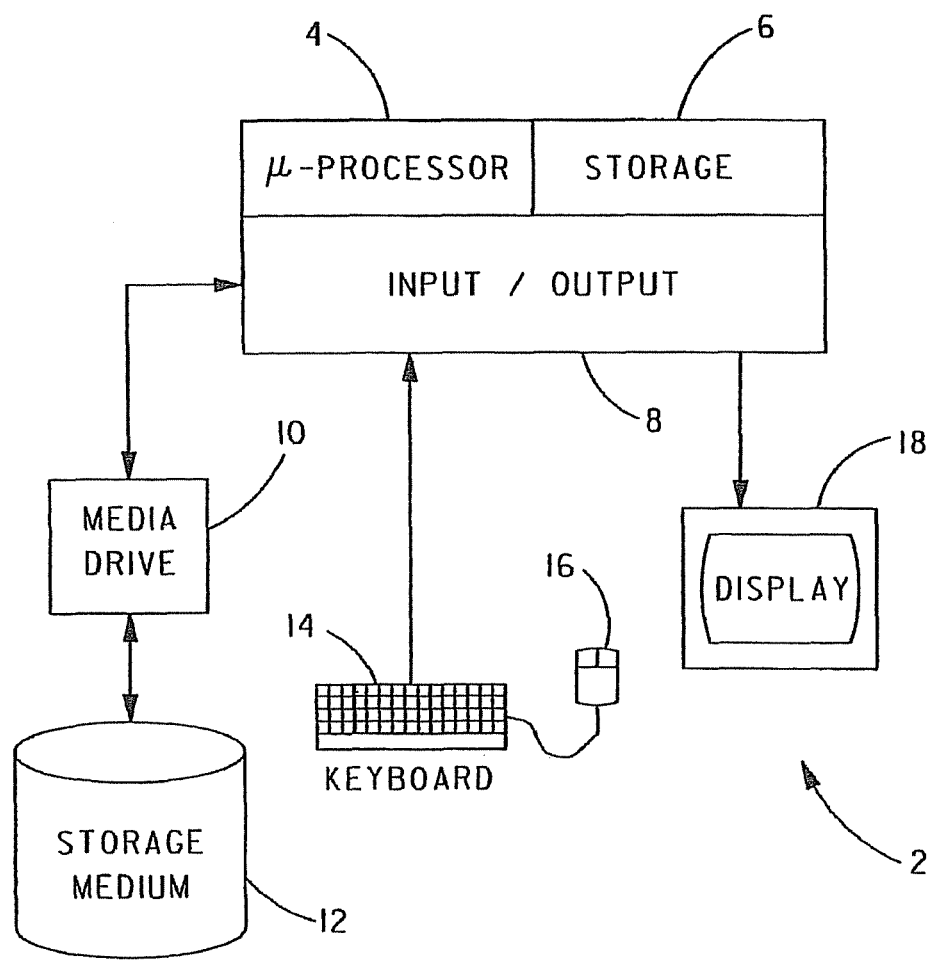
FIG. 1 is a schematic illustration of a computer system that can be utilized in a standalone mode or as part of a computer network for implementing the computer software that embodies the present invention.

With reference to FIG. 1, the present invention is embodied in computer software which executes on one or more standalone or networked computers 2. Each computer 2 includes a microprocessor or processor 4, a computer storage 6, and an input/output system 8. Each computer 2 can also include a media drive 10, such as a disk drive, CD-ROM drive, and the like. Media drive 10 can operate with a computer storage medium 12 capable of storing the computer software that embodies the present invention, which computer software is able to configure and operate computer 2 in a manner to implement the present invention. Input/output system 8 can include a keyboard 14, a mouse 16, and/or a display 18. Computer 2 is exemplary of standalone or network computers capable of executing the computer software of the present invention and is not to be construed as limiting the invention.

The compliance, execution and reoptimization (CER) system described herein can do more than simply provide visibility into procurement decisions and the degree to which they are compliant with contracts and projected spend quantities against each contract. Herein, reoptimization may also be referred to a procurement strategy optimization.

In addition to providing visibility into procurement decisions and the relationship with the outcome of a sourcing event, the CER system provides for improved compliance through contract reconciliation, improved procurement decisions through optimal contract execution, and an improved sourcing process through optimal procurement strategy optimization. Thus, the CER system leverages optimization technology in directly reducing savings leakage by optimizing against contract terms given procurement decisions, in improving procurement decisions in the first place, and finally in integrating with the sourcing process by providing procurement strategy optimization and guidance for strategic decision-making in regard to new offers from suppliers.

To summarize, the following two aspects of contract compliance are not addressed by current contract compliance systems:

Optimal payment reconciliation: For example, is the buyer getting the multi-item discounts associated with bids from winning suppliers in the sourcing event? The contracts signed at the completion of the sourcing event may include discounts based upon volume commitments across multiple items that are not usually purchased in a single order, in which case the buyer needs to periodically look at the purchase transactions and check for applicable discounts and rebates. Compliance of this form in the presence of expressive contracts requires optimization, in order to ensure that the correct payments are made to suppliers given a sequence of procurement decisions made over some period of time.

Optimal execution: For example, is the buyer procuring goods or services in a way that is consistent with the allocation of forecast goods or services as determined at the outcome of the sourcing event? If the contract management system and procurement systems are unable to accurately implement the discounts or rebates that the sourcing application was able to negotiate, then the line-item pricing is inaccurate. There should be a way to inform a buyer that he should be buying from a different supplier if this is more advantageous. Again, this can leverage optimization to allow procurement decisions to be made that are optimal given an expressive contract and future procurement projections.

The counterpoint of an optimal execution decision-support tool is a benchmarking tool which provides insight on the quality of past execution, a third feature not addressed by current systems:

Procurement strategy benchmarking: For example, did I purchase my supplies last year in the best possible way given my contracts and with the benefit of hindsight? In order for buyers to gain trust in the recommendations of the execution decision support tool, it is important they realize that the past execution had room for improvement. Such an analysis tool could consider all the spend made with respect to a number of expired contracts, and compute the a posteriori optimal spend achievable by reallocating the purchases to different suppliers or by slightly anticipating some purchases so as to merge orders. If the cost of the a posteriori optimum spend is far below the actual, it suggests that either the forecasting team or the procurement team is performing poorly.

An additional category of savings that current compliance systems are unable to take into account is the loss that comes from the contracts that are fixed upon termination of the contracting process not being as stated at the outcome of the sourcing event. This could be because of manual negotiation of A) some of the pricing details that were already set in the sourcing event, and B) the inclusion of additional elements that the sourcing event did not specify but a legal contract does specify. By coupling the outcome of a sourcing event with the procurement process our system has the information to detect and report losses in category A. This enables more comprehensive contract compliance and spend visibility than compliance and/or visibility systems that are not well integrated into sourcing events.

The fourth main functionality of the CER system is in regard to procurement strategy optimization.

Procurement strategy optimization: For example, should I reallocate future spend between existing contracts given current contract utilization and revised projections about demand for different goods and services? Should I accept a new offer from a supplier given current contract utilization and future projections? Should I end a relationship with an existing supplier given current contract utilization and future projections? Whereas current sourcing is event driven, wherein a strategic decision for a category of purchases (or across multiple categories) is made periodically and without recourse, the CER system enables optimization to be used more frequently for strategic decision making so that sourcing becomes a continual process with a feedback loop from contracting. Another strategic decision that can be supported is when to request new bids from suppliers.

A side benefit of more effective procurement systems is that transactional data is "cleaned" as transactions are performed, which together with up-to-date data on completed and projected spend, and other information such as the number of price disputes with a supplier, enables a firm to be always "sourcing ready."

Operationally, the compliance system can integrate with existing contract management, procurement, and transaction networks. By careful monitoring of transactions the compliance system can monitor and reconcile purchases in real time by identifying discrepancies between contracts, POs, and invoices. Elements of expressive contracts including market-share discounts and rebates, volume discounts, rebates and penalty clauses can be acted upon automatically (in the case of a problem).

The CER system can catch non-compliance issues as they occur and can resolve disputes before any payment happens through automated dispute creation and notifications at the transaction level. For example, aggregate volume rebates that trigger as new threshold volumes or spend levels are achieved cannot be tracked by current systems in real time and companies make incorrect payments due to their inability to capture these rebates. Another benefit is in regard to accessorial charges, including such items as freight and tax charges. For example, in generating an invoice from a PO, a vendor will typically include additional information such as taxes, surcharges, freight, and so on as dictated by the government or a contract. Many current systems are unable to check the difference between a PO and an invoice in sufficient detail, but instead just check that they are within some percentage of each other. If provided with freight tables, tax, surcharge information this can provide additional compliance and visibility.

One embodiment of the compliance system provides for issue notification, wherein disputes are identified, opened as an issue, and then tracked until resolved. This system can in turn allow for metrics to be tracked about the performance of different buyers. The system can also allow for collaborative issue resolution, with suppliers being able to access information in a secure environment and in turn improve the speed with which issues can be resolved.

Reports can be generated to provide savings visibility by period, business unit and so forth in order to determine actual historic costs and set appropriate historic pricing metrics. The system can also generate reports about what the savings leakage would be without the system to illustrate return on investment. Maverick spend can be identified, with reports about which transactions are affected along with responsible buyers and suppliers. By tracking maverick spend, the system enables a user to improve contract coverage and increase savings opportunities. The system can dynamically and visually report on total spend, spend under contract, maverick spend, non-compliant spend and so on.

Illustrating the Need for Optimal Reconciliation:

The first problem identified is the lack of compliance that occurs when incorrect payments are made to suppliers given the actual procurement decisions made. For example, the terms of the contract may allow for a discount to be triggered when a particular quantity threshold is reached across multiple purchase orders. But without a system to monitor the total spend and match it against contracts this discount will not be collected. There may also exist multiple possible discounts that could be used, and therefore exist the need for optimization to determine the best payment terms.

Example 1 (non-compliance: rebates): A contract has a volume discount: item A @ $12/unit if between 1 and 50 units are purchased, item A @ $11/unit if between 51 and 100 units are purchased, and item A @ $10/unit if more than 101 units are purchased. This is the discounted price for all units purchased.

Even if a procurement system updates the catalog with the correct ongoing item price, based on the cumulative quantity purchased across purchase orders the total payments will be incorrect. In the example, the item price would initially be $12/unit, with this price subsequently updated to $11/unit and $10/unit. But upon an update from $12 to $11, a cumulative rebate is due from the supplier for 50 @ $1=$50 for the 50 units already purchased at $12. The buyer must track spend and know to trigger this rebate but current systems do not provide this functionality.

Example 2 (non-compliance: discounts): A contract has a volume discount: item A @ $12/unit if between 1 and 50 units are purchased, item A @ $11/unit if between 51 and 100 units are purchased, and item A @ $10/unit if more than 101 units are purchased. This is the discounted price for all units purchased.

One way to handle this contract in current procurement systems is to populate the catalog with an item price based on a projection of the cumulative quantity that will be purchased, e.g., this might be a price of $10/unit in the example. But the supplier must then track the spend and request a payment from the buyer if the quantity target is not met. For example, if the total quantity sourced in the lifetime of the contract is 75 units then a payment of 75 @ $1=$75 should be made to the supplier. Support for compliance of this form is not provided in current systems.

It is the balance of power between buyer and supplier in an industry often determines the status-quo: if suppliers are powerful then rebates are the norm, if buyers are powerful then discounts are the norm. Either way, there is a need to provide for optimal reconciliation to ensure that correct payments are made between a buyer and a supplier over the term of a contract.

The next example illustrates the challenge of determining which of multiple offers in a contract should be active to obtain the lowest price.

Example 3 (selecting from multiple offers): The contract with supplier 1 includes two discounts on the cumulative purchases made by the buyer during the term of the contract, only one of which can be accepted. In this example, the choice of offer can be made at any time as long as the contract is valid, and this choice can affect due payments for past purchases. Offer 1 provides a discount of 5% on all items except A and B if more than 500 units of A and B are purchased at full price. Offer 2 provides a discount of 10% on all units of A purchased. The undiscounted item prices are $100 for items A and B and $20 for items C and D.

The buyer procures 500 units each of A and B and 2000 units each of C and D. With offer 1, the total payment would be (1000 @ $100)+0.95*(4000 @ $20)=$176,000. With offer 2, the total payment would be (500 @ $90)+(500 @ $100)+(4000 @ $20)=$175,000, which is the best deal.

The next example illustrates the use of forecasts in performing reconciliation. For example, suppose that at the end of each month the items procured during the month—the spend—must be assigned once and for all to one of the offers from a supplier.

Example 4 (forecast-based reconciliation): The two offers from the supplier are as in the previous example. But now the decision about which offer to leverage must be made after the procurement of 200 units of each of A and B and 1000 units of each of C and D have been procurement.

If the forecast is that at least 300 additional units each of A and B will be procured and at most 1000 additional units of each of C and D then offer 2 should be used. On the other hand, if the forecast is that no more than 100 additional units of A will be procured and more than 1000 additional units of each of C and D will be procured then offer 1 should be used.

The previous examples relate to the inability of current procurement systems to ensure compliance with contract payment terms as a result of procurement decisions made across multiple POs.

Similar problems can also occur even for purchases in a single PO when contracts include within-order expressiveness, for example when there is a discount for purchasing a certain number of items or a combination of items at the same time within a single purchase order. This is illustrated in the following two examples.

Example 5 (within-order packages): Consider a contract with a price of $100 when items A, B and C are purchased simultaneously (a package price), along with individual item prices of $40 for each item.

A compliance system should ensure that a payment of $100 and not $120 is made to the supplier in the event that these items (and perhaps others) are purchased within a single purchase order.

Example 6 (within-order tiered discounts): A contract might provide an item price of $10 per unit for less than 100 units and $9 per unit for 101+ units. Again, a compliance system should ensure that the correct line item price is adopted within a single purchase order, considering the within-order expressiveness of the contract and the quantities of each item in the purchase order.

Illustrating the Need for Optimal Contract Execution:

The second problem that we identify is that of myopic decision making, wherein individual procurement decisions are not optimal given projections about total spend against the contracts struck at the outcome of a sourcing event. This motivates the need for a system to support optimal contract execution.

Current procurement systems are inexpressive and populated by a single "line item price" for each item. This price neither reflects the role of this item in discounts (e.g., on future purchases of this item or other items), nor the reason for including a supplier at the outcome of a sourcing event, for instance a supplier might have a higher price but be included because it is an incumbent or to mitigate risk through a split allocation.

Example 7 (split-allocation): The final sourcing allocation (identified at the completion of a sourcing event) includes two contracts:

Contract 1. From supplier 1 for item A @ $10/unit.
Contract 2. From supplier 2 for item B @ $12/unit for [1,50] and @ $8/unit for [51,∞).
Split allocation 50 units from supplier 1 and 150 units from supplier 2.

The forecast adopted during sourcing is that 200 units will be purchased altogether. Note that it would be cheaper overall to purchase all 200 units from contract 2 (given the discount on units 51-200), but the split allocation requires that supplier 1 is also used.

Current procurement systems will include both item prices (that from supplier 1 and that from supplier 2) in the catalog and all procurement decisions of less than 100 items will typically be performed myopically against contract 1 at the cheaper price of $10/unit. One can see that the myopic procurement does not reflect the business rules that were identified by the buyer during the sourcing event; e.g., the goal of splitting allocation across multiple suppliers rather being completely driven by price. Instead, with help of the CER system, a procurement plan should be decided that contains information, such as business rules, so that following the plan will produce the splitting decided during sourcing.

Example 8 (multi-item volume discount): The final sourcing allocation includes two contracts:

Contract 1. From supplier 1 for item A @ $10/unit.
Contract 2. From supplier 2 for item A @ $12/unit and item B @ $12/unit for total volume [1,50] and then A @ $10/unit and B @ $8/unit for total volume [51,∞).

Split-allocation: Buy 50 A from supplier 1, 50 A from supplier 2, 100 B from supplier 2.

Current procurement systems will include the item price of $10 for A from supplier 1, and $12 for A and B from supplier 2 in the catalog. Procurement decisions for item A will then be myopically made against the contract with supplier 1, and the total cost will be (100 @ $10)+(50 @ $12)+(50 @ $8)=$2000. On the other hand, if 50 units of A were instead procured from supplier 2 then the total cost would be (50 @ $10)+(50 $12)+(100 @ $8)=$1900.

These examples illustrate the problem that can occur when the paucity of information in procurement systems leads to suboptimal, myopic procurement decisions. A simpler problem can exist when the item price itself is incorrect because the price is not correctly updated to reflect a new item price given a cumulative quantity purchased across orders.

Suboptimal procurement decisions can also be made within the context of a single purchase order (PO). This is illustrated in the following two examples.

Example 9 (within-order packages: kits): Consider a contract with a price of $100 for a package consisting of one unit of A, one unit of B, and one unit of C. Purchased separately, A, B, and C are priced at $40 per unit.

An expressive procurement system should alert a buyer that submits a request for items A and B that item C could be purchased for an additional cost of $20.

Example 10 (within-order tiered pricing): Consider a contract with a unit price of $10 per item for 1 to 100 units and $9 per item for 101+ units, where the lower price applies to every unit purchased.

An expressive procurement system should alert a buyer that submits a request for 80 units that a volume discount exists for 101 units or more. This could lead to less myopic decision making—where procurement is made in purchase orders of size at least 101 in order to leverage the discount.

Illustrating the Need for Procurement Strategy Benchmarking:

Spend-analysis systems are reporting tools aiming at providing insight on what is bought and on the skills or the procurement teams. Some tools have data-mining compatibilities aiming at finding opportunities for savings, by changing some aspect of how the procurement was made in the past. However, systems limited to line-item prices cannot take into account the fact that a different buying strategy in the past could have triggered different discounts.

Example 11 (uneducated buyers): Consider again the setting of example 8. Assume that, as forecasted, 100 items A and 100 items B were bought over the contracts lifetimes. Suppose the buyers were being myopic, and spend a total of $2000 by buying all of A from supplier 1, because they ignored the recommendations of the optimal contract execution decision support tool. We can quantify the loss to due this behavior, and use this analysis to make the buyers aware of the consequences of their behavior.

Illustrating the Need for Procurement Strategy Optimization:

The third problem identified here is the need for procurement strategy optimization, wherein rather than using periodic sourcing events, continual feedback from the procurement process can be used to trigger reoptimization. For example, a decision could be made to change the current allocation of projected spend to contracts based on new market projections about demand and spot market prices. To give another example, there could be an opportunity to accept an offer from a new supplier and the optimal decision would require solving an optimization problem involving the current contracts, past procurement decisions, and projected demand.

Another element of a method for procurement strategy optimization is to determine when to run a new sourcing event.

Example 11 (switching to a new supplier): A sourcing team closes an event with a set of expressive offers and selects an allocation to suppliers 1 and 2. But the offers from all suppliers in the event remain valid for the next 6 months, and the sourcing team can reoptimize the allocation given new information about:

spot market prices
quantity projections
item requirements (new items, retired items, etc.)

For example, suppose that supplier 1 offers a unit price on A of $100 per unit if at least 50 items of B are purchased, and $130 per unit otherwise. The price on item B is $110 per unit. Supplier 2 offers C for $50 per unit. Supplier 3 offers A for $110 per unit and B for $100 per unit and C for $60 per unit.

Given a projection to purchase 200 units of A and 50 units of B and 100 units of C then the optimal sourcing decision is to procure A and B from supplier 1 and item C from supplier 2.

But suppose now that the projection for the demand for B is adjusted downwards to 10 units, some time after the sourcing event. It would now be beneficial in procurement strategy optimization to allocate items A and B to supplier 3 because the contracted price with supplier 1 will be $130 rather than $100 per unit of A when insufficient units of B are purchased.

Example 12 (closing out a supplier): Suppose instead that the offers from losing suppliers during the sourcing event are no longer available and cannot be considered for forming additional contracts. Nevertheless, procurement strategy optimization—where the allocation is shifted among the contracts that were signed with winning suppliers at the completion of the sourcing event—can be useful. In the example above, suppose that supplier 2 is also able to sell A for $110 per unit and B for $100 per unit. Then if at some point the projected demand for item B changes and is adjusted to 10 units from 50 units, the sourcing team could use reoptimization to tigger an allocation of all ongoing procurement to supplier 2, and could also close the sourcing relationship with supplier 1 altogether in the event that it is not providing useful risk mitigation or serving some other purpose.

Example 13 (evaluating an offer from a potential supplier): A sourcing team closes an event with a set of expressive offers and selects an allocation to suppliers 1 and 2. But each month, additional offers are received from new suppliers. The sourcing team can use information about current procurement and future projections to determine whether or not to accept the new offer.

Suppose as above that suppliers 1 and 2 were selected in the initial sourcing event. Supplier 1 offers a unit price on A of $100 per unit if at least 50 items of B are purchased, and $130 per unit otherwise. The price on item B is $110 per unit. Supplier 2 offers C for $50 per unit.

Now suppose that a new supplier makes an offer subsequent to the event to sell item A for $110 per unit, item B for $110 per unit, and item C for $40 per unit. But the offer is contingent on the supplier being awarded at least 50% of the total dollar volume purchased on every item.

In the event that the demand projection is that 200 units of A, 110 units of B, and 1000 units of C for the next year but that the sourcing teams wants to retain two suppliers on each item, then the optimal decision would be to retain supplier 1 for around half of the procurement of items A and B, and adopt the new supplier for the remaining amount of items A and B and the majority of item C, while leaving supplier 2 with the remaining demand on item C in order to keep a split allocation and for risk mitigation purposes.

Background: The "Optimize and Dispatch" Framework:

The "optimize-and-dispatch" framework described in U.S. patent application Ser. No. 11/881,737, incorporated herein by reference, provides a method for dynamic resource allocation in the context of long-term contracts and uncertainty about supply and demand. This is additional background to the current invention in that optimize-and-dispatch is also concerned with coupling periodic, strategic optimization with ongoing, operational allocation decisions. There are however some significant differences.

A typical application suggested for optimize-and-dispatch is that of Internet advertising. This is the process by which capacity on web pages such as those of content providers and search engine results is sold for advertisements. But optimize-and-dispatch is also pertinent to the current invention because it allows for the coupling of periodic optimization within an "optimizer module"—to set the strategic direction for allocating resources—with a continual dispatch process by a "dispatch module" that seeks to make period by period allocation decisions consistent with the strategic direction set by the optimizer.

In application to Internet advertising, suppose that a web page is allocating advertisements dynamically to Internet users in order to maximize revenue achieved from contracts from advertisers. These contracts may represent expressive bids, for example a bid from an advertiser who is only willing to appear if she receives an exclusive allocation among other firms in a similar product category, and only if the number of impressions received in 1 month is at least 1 million. The optimizer module will periodically consider the state of each contract—the number of impressions of different kinds allocated to each advertiser—as well as alternate contracts and projections on future supply and demand, and determine how to configure the dispatcher module to allocate supply over the next period of time.

For example, the optimizer might instruct the dispatcher to allocate 20% of supply of type A to advertiser 1 and 80% to advertiser 2.

For each new web site access (=impression), the dispatcher then considers both the detailed requirements of a bid and also the parameterization provided by the optimizer. For example, the class of impressions of type A may be more coarse than that which is really demanded by advertiser 1. When a unit of supply of type A is received the dispatcher will first consider whether advertiser 1 is in fact interested. Only if both advertiser 1 and advertiser 2 is interested is there a decision to make, with the dispatcher than dividing supply by the 20:80 allocation policy.

In this way, the optimizer parameterizes a dispatch plan that is executed by the dispatcher. The dispatcher module allocates supply to each contract in real-time as supply is realized, and perhaps also considering additional details specified by a bidder that precisely pinpoint desired resources.

Rather than environments with one seller and multiple buyers, the current invention is focused on environments with one buyer and multiple sellers, where the dynamic decisions are in regard to which supplier to buy which goods (or services) from. The set of contracts are with suppliers, and procurement decisions are made in response to the dynamic realization of demand within an organization. Procurement strategy optimization provided by the CER system is related to the optimize-and-dispatch system, where the optimizer is used periodically to reconfigure the dispatcher. Procurement strategy optimization takes the place of the optimizer and allows for the allocation to be reoptimized as projected demand changes and in response to the availability of new or modified contracts. In place of the dispatcher is the procurement process. It is within procurement that short-term, tactical decisions are made about which contract to use for each realization of demand.

One departure from the optimize-and-dispatch framework is that the "dispatcher" of procurement is not truly automated, or programmable, in the sense of the dispatcher. Rather, employees within a firm are the ones that are responsible for the dispatch of the outcome of a sourcing event. For example, consulting the prices on line items in a procurement system in making a decision or even going off contract and buying from an alternate supplier. An automated, programmable dispatcher would require a fully automated procurement system, with employees (or other systems) determining demand but the procurement system automating decision making about which contracts to execute against. An additional departure is that the "optimizer" of expressive sourcing is often a human-computer hybrid with human decision makers (=the sourcing team) involved in exploring different scenarios via constraints and adjustments before settling on a sourcing outcome.

But aside from the procurement strategy optimization provided by this invention, the additional functions of optimal reconciliation and optimal execution are novel and non-obvious in view of the optimize-and-dispatch framework.

The need for reconciliation within procurement is because payments are determined by procurement systems and subsequently collected by an accounts payable systems without considering the full complexity of expressive contracts. Rather, the process of determining a PO and then invoicing is limited typically to item prices as represented in a price catalog that instantiates the procurement system. It is this lack of information that leads to the need for reconciliation.

By comparison, in the optimize-and-dispatch framework the payments that must be tracked by the optimizer—for example those that require visibility into the long-term state of a contract—are collected by the optimizer, and not collected within the dispatcher. Payments are correct by design and there is no need for reconciliation. Payments collected within the dispatcher are only those for which there is enough information available at dispatch to determine correct payments.

Similarly, the need for optimal execution that is fulfilled by the CER system is not required in optimize-and-dispatch because the dispatcher is programmable and configured—and then reconfigured—to fulfill the requirements of the optimizer. As discussed earlier, optimal execution is a problem in contracting because the procurement process is executed by employees and may mismatch the intent of strategic decision making in regard to sourcing because of insufficient information about the outcome of the sourcing event, bad alignment of interests, or other problems such as maverick buying.

Interfacing with the Contract and Procurement Process:

The CER system needs to be able to monitor the procurement process in order to track the state of each contract and perform contract reconciliation, contract execution and procurement strategy optimization. Similar to current compliance systems, one possible approach to monitoring is to connect to one or several database systems that contains records of purchases and payments. There may be a data warehouse storing all information in one place, or it may be necessary to connect with several systems. For example, connecting with an Account Payable (AP) system may be required to retrieve payment data, and connecting with a procurement system may be needed to retrieve POs. This and associated information in regard to contracts, POs and invoices are described next.

An additional need for the CER system is information about the outcome of the sourcing event and/or the contracting process in the form of contracts with suppliers, including all information pertaining to the expressive bids from winning suppliers. The CER system also requires volume forecasts, and provides a method to allow a user to adjust these via import/export from another system or through direct input.

Receiving Information about Supplier Contracts:

The CER system requires an electronic form of contracts in order to support automated compliance, execution and reconciliation. This electronic form should in particular be able to represent the contracts generated from the expressive bids from winning suppliers in a sourcing event. In particular, more information is required that than provided to current procurement systems, which is limited to information such as line item prices and single-order tiered prices. The CER system is also connected to procurement systems in order to make adjustments to contracted supplier prices, for example upon achieving a new across-order volume tier. The CER system may make other corrections to the information with the procurement system as and when they are identified.

There are multiple methods by which contract information can be entered into the CER system, all of which can be roughly divided into the following two categories:

Direct. The system used for e-sourcing can generate an electronic representation of the contract in an export format (EDI, cXML, Excel, etc.), tailored as appropriate to represent the bids submitted by winning suppliers, i.e., the contracts with suppliers that will be derived from these bids. This is known as awarding-from-the-tool. This process might require, in addition, information from sources such as a supplier's catalog of prices and market prices.

Indirect. The information from the outcome of the sourcing event may instead come indirectly, for example entered into the contract compliance system manually upon termination of additional negotiations with suppliers in finalizing contracts (or, at this point via the same export and upload approach as in the direct method.) To aid with this more indirect approach, an e-sourcing system can be modified to generate natural language from accepted offers (expressive and non-expressive) which could be copied directly into contracts. This would provide benefits in reducing savings leaking that can occur due to deals being manually renegotiated, or otherwise changed between the outcome of a sourcing event and the finalization of an actual contract.

The CER system described here is not a contract management system and need not support "red-lining" of contracts and so on. On the other hand, the CER system needs to be able to detect changes in contracts if and when they occur. For this reason, once entered into the compliance system there is a need for contracts to be maintained and edited on an ongoing basis by sourcing and procurement teams (e.g., new items, changes to line item prices, and so on).

When this is performed within an (external) contract management system then the system for contract compliance needs to be able to detect and import these changes. Users can also create and edit relevant contract information (for example, as it relates to payment clauses) in the CER system through an interface. This could, for example, be a multi-step process that guides the user through making a contract including all the contract clauses. By "Master System" we refer to a database or other storage module that maintains information about items (i.e., goods and services) and suppliers pertinent to contract compliance. The "master" indicates that this is the primary repository, with conflicts resolved in favor of the Master System in the case of inconsistent data across multiple databases or storage modules or other problems of data integrity.

Some elements of contracts that can be used by the CER system include, without limitation:

Master System Information: the name of the master system, the key, and any other information needed to keep the two systems in sync.

Contract Dates: start date, expiration date

Contract Limits: set the maximum PO amount for this contract regardless of a user's spend limits.

Contract Forecasted Volumes: set the expected forecasted volumes of the items to be purchased off this contract.

Contract Accessorials: these are charges that appear within an order that affect total price; e.g., multi-stop charge, gas surcharge, etc.

Supplier Item list: The list of all the supplier's Items is maintained in a Supplier Item List.

Line-item Pricing: for each item in a contract, the single unit price, or single-order dollar/unit volume tiered pricing. Some items will enter into the contract or be removed from the contract over the life of the contract. Line-item pricing can change over the life of the contract as well.

Expressive pricing clauses: for example, contract term dollar/unit volume tier pricing, and other clauses that provide a special relationship between the buyer and supplier.

In entering expressive contract clauses, which as discussed above are not typically maintained in structured (e.g., non free text form) in current contract management or procurement systems, these can similarly be imported from an XML or Excel or some other format, or created through a user interface. Over the term of a contract, these expressive clauses may need to be updated or deleted, again typically with an effective date.

Supported forms of expressive contract clauses include many forms of conditional offers. A conditional offer consists of a trigger condition, which specifies in what case the offer applies, and an effect, which describes what should happen when the offer applies. A few examples include, without limitation:

Within-order single-item marginal tiered pricing: for a given item A in a given order, the unit prices of the item are smaller for items above a certain threshold. This smaller price applies only to the excess, not to all the items order.

Within-order multi-item marginal tiered pricing: for a collection of items in a given order, the unit prices of the item are smaller for items above a certain threshold. This smaller price applies only to the excess, not to all the items order. Some convention about the ordering of the items of the collection has to be specified.

Within-order multi-item average tiered pricing: for a collection of items in a given order, the unit prices of the item are smaller for items above a certain threshold. This smaller price applies to all the items ordered, not just the excess.

Multi-item conditional unit volume (Conditional Units per Term): If I am given a certain unit volume across a set of trigger items, then I will give a discount/rebate to a set of discount items using a schedule.

Multi-item conditional percentage unit volume (Conditional Percentage Units per Term): If I am given a certain percentage of unit volume across a set of trigger items, then I will give a discount/rebate to a set of discount items using a schedule. The condition must be satisfied at the end of the contract term.

Multi-Item conditional dollar volumes (Conditional Volume per Term): If I am given a certain dollar volume across a set of trigger items, then I will give a discount/rebate to a set of discount items using a schedule.

Multi-Item conditional unit volume per order (Bulk Offers): A conditional offer in which a supplier provides an incentive (discount or rebate or bulk price) to the buyer based on a group of items being purchased together at a set quantity per item per order.

Market-Share Offer: A conditional offer in which a supplier defines a market basket and time period and provides an incentive (discount or rebate), in the same market-basket or a different one, to the buyer for awarding them a defined % of volume (units or dollars) in the defined market basket over the time period.

As would be natural from the state-of-the-art on expressive sourcing, each of these expressive contract clauses could be combined with additional conditions such as time intervals to restrict their validity. The precise semantics of these clauses can vary widely. For example, for each of the above offers, the clause can be specified as:

A rebate: if the trigger condition for the offer is met, then the seller owes an amount of money to the buyer.

An anticipated discount: the buyer claims that it will meet the trigger condition for the offer at some point in time. On that basis, the seller agrees to proceed as if the offer was already effective, and keeps track of the total discount that the buyer has benefited. If, at some date, the promise of the buyer has not been met, then the buyer must pay back this total discount to the seller. This amount is the discount liability.

A state-based discount: the buyer initially pays non-discounted price. Once the trigger condition for the offer is met, he will pay discounted prices. The effect is not retroactive: it will affect only later transactions.

A penalty-based commitment: somewhat similarly to the anticipated discount scheme, the buyer commits to meet the trigger condition of the offer at a certain point in time, and on that basis receive discounted prices. If the buyer does not meet his commitment, he then owes a penalty to the buyer those amount is computed according to rules specified in the clause.

As the different implementations of offers above can be combined with the different type of items, we then get a wide array of possibility, such as:
- an across-order multi-item dollar-volume anticipated discount,
- an across-order multi-item dollar-volume state-based discount,
- an across-order multi-item dollar-volume rebate,
- an across-order multi-item quantity-volume anticipated discount,
- an across-order multi-item quantity-volume state-based discount,
- an across-order multi-item quantity-volume rebate,
- an across-order multi-item market share anticipated discount,
- an across-order multi-item market share state-based discount,
- an across-order multi-item market share rebate,
- an across-order multi-item growth-based anticipated discount,
- an across-order multi-item growth-based state-based discount,
- an across-order multi-item growth-based rebate.

Additional forms of contract expressiveness include offers that apply within a single PO, for example so-called "kit" or "package" offers where a set of items is priced to be purchased as a single unit:

Single-Price Packages: a set of items that if ordered together at certain quantities in the same order, then the total price for all the items together is discounted.

Line Item Package: a set of items that if ordered together at certain quantities in the same order, then the line item price is discounted.

Incumbent Incentive Offers.

Growth Offers: A conditional offer in which an incumbent supplier defines a market basket and time period, then provides an incentive (discount or rebate), in the same market-basket or a different one, to the buyer based on growth over historic figures in volume or market-share (in price or units) in that market basket over that time period. The incumbent supplier has the option of applying the incentive across all of the awarded business or only the growth.

A supplier might also specify a multi-item capacity constraint, to state a capacity unit limitation on some set of items.

The CER system needs to be notified if a change occurs to the main contract and also notify the procurement system of price changes that occur as the result of contract clauses being triggered. If the contract management system supports notifications, the CER system can automatically receive notifications of changes and get and import the updates.

Organizations may sometimes also purchase goods or services without a contract in place, either on an ad hoc basis with a preferred vendor or through supplier-enabled catalogs or catalogs available through third-party providers.

In this case, these catalogs will also provide relevant information such as line-item pricing, tiered pricing when purchasing multiple units in a single PO, the price on packages of items in a single PO, and also details of additional charges such as taxes and freight. On rare occasions, a catalog will also have order (sometimes tiered) discounts that are determined by considering a complete PO rather than just quantity in regard to a particular item in a PO, such as: (i) order value—if the order value is a certain amount, a discount is applied; (ii) order quantity—if the total amount of quantity is purchased, then a discount is applied; and (iii) order time—if the order is placed between certain hours or within a date range, then a discount is applied.

Tracking the Procurement Process:

The CER system needs to be able to keep track of the current state of each contract.

One embodiment of the CER system monitors the sequence of procurement decisions within an organization by tracking the flow of POs and invoices between buyers and suppliers.

The main transactional items generated during the procurement process are:

Purchase Order (PO): Created by the buyer and sent to a supplier. If there is a contract in place for these items from this supplier, then the PO may have been created from this contract and it is associated with this contract. The supplier may dispute the PO and send back to the buyer, process continues until the PO is accepted by both buyer and supplier. A PO generally contains at a minimum a supplier, a line-item listing with pricing, and a PO price summary. Some POs may have no direct price information, with the price information generated instead by reference to a catalog of prices or the contract with a supplier that specifies payment terms. Each line-item detail includes: item description, item quantity, item price, and line-item price. In some circumstances a line item will also include the line-item adjustment, total line-item adjusted price. The PO summary includes: the number of line items, the total quantity, total line-item price (PO total). If adjustments are included then it also includes: total line-item adjustments, total line-item adjusted price, PO adjustment, and PO adjusted price. The PO may or may not contain the contract identifier.

Invoice: An invoice is sent by a supplier to the buyer upon delivering the goods or services. The buyer may dispute the invoice for various reasons, sending an updated invoice to the supplier. The supplier may dispute and send an updated invoice back to the buyer. This process continues until the buyer and supplier both accept the (modified) invoice. An Invoice contains similar information as the PO. An Invoice generally contains at a minimum: the original PO, if applicable (specifically, a reference to the PO, e.g., PO number, a buyer, a supplier, a line-item listing with pricing, and an invoice price summary. Some Invoices will not include a reference to the PO. Each line-item detail includes: item description, item quantity, item price, line-item price. In some circumstances a line item will also include the line-item adjustment, total line-item adjusted price. The invoice summary includes: the number of line items, the total quantity, total line-item price (invoice total). If adjustments are included then it also includes: total line-item adjustments, total line-item adjusted price, invoice adjustment, and invoice adjusted price that includes taxes, surcharges, freight, etc which may not be specified within the POs. The invoice usually does not, but may contain the contract identifier.

Bill of lading: A receipt of the items that were actually delivered. There may be multiple Bills of Lading for a single PO when the items needed to be delivered in multiple shipments.

Payment: Once the invoice is accepted, a payment is created by the buyer and sent to the supplier. The payment usually corresponds to the invoice received and is recorded in the Accounts Payable (AP) System. The supplier may dispute the payment, sending an updated payment request to the buyer. The buyer may dispute the payment request and send an updated payment request to the supplier. This process continues until both the buyer and supplier accept the (modified) payment at which point monies are exchanged and the PO is closed, meaning that no further transactions are required to be performed between buyer and seller in regard to the PO.

All POs, invoices and payments go over some type of procurement transaction network. This could be as simple as putting the records into the buyer's accounting system from which they make payments from their bank accounts. A procurement transaction is any communication between the buyer and the supplier regarding a PO, invoice, bill of lading, or payment. Each time the buyer and supplier contact one another regarding purchasing some goods, there is a transaction or a record of the communication. Sometimes the record is only in the "Accounts payable system" and does not go between the parties directly. The transactions are usually encoded via the Electronic Data Interchange (EDI) or Commerce eXtensible Markup Language (cXML) standards. Accounts payable systems can usually export all the payment records into a variety of formats above including Excel/Comma Separated Values (CSV). A buyer may have multiple transaction networks with which to communicate with different suppliers and vice versa.

Additional data that can be leveraged in configuring the CER system includes that from the Master System information, such as:

Supplier master list: The Supplier Master is a listing of suppliers that the Buyer purchases goods from. It does not contain the items the supplier supplies or the departments that buy from this supplier. The suppliers in the Supplier Master may or may not have an existing contract with the Buyer. A typical entry in a Supplier Master would be supplier identifier, supplier name, supplier DBA (Does Business As), supplier category, supplier address, supplier billing address, supplier shipping address, supplier sales contact, supplier billing contact, and supplier shipping contact.

Item master list: A listing of items that describes each item. It does not contain information about the supplier, price, or the department that purchases it. A typical entry in an Item Master would be item identifier, item name, item description, unit of measure, unit size, unit quantity, classification, manufacturer, and manufacturer SKU. For example a case 500 of 100 cc plastic syringes from Stryker Corporation could have: item identifier '1', item name '100 cc syringes', item description 'case 500 of 100 cc plastic syringes', unit of measure 'cc', unit size '100', unit quantity '500', classification 'syringe', manufacturer 'Stryker', manufacturer SKU '123-2345643-09876'. So if 200 cases were purchased, the Buyer would reference the item identifier '1' with an order quantity of 200.

The CER system need not be the system of record for items. When changes to the external item master has changed, the CER system needs to be able to detect these changes and import the changes as required by a user. The CER system can also be used to augment the information that is not captured in the external item master by additional item attributes. These are attributes the user wants to keep about this item. This is not to be replicated in the item master system, but can be updated and viewed in the CER system. These additional attributes could be as simple as the distribution center where they are delivered from, or more complex information such as the dimensions of the item. These additional attributes can be used later in e-commerce sourcing events or to allow for additional spend visibility by indexing in user generated reports.

Information associated with items in the item master includes:

General Item Information: name, UNSPEC, short description, long description, active or not.

Master System Information: the name of the master system, the key, and any other information needed to keep the two systems in sync. It also includes all the information from the master system if it is available.

Item Availability Dates: this are the dates when the item is available and when it expires. When the item expires the user can supply another item as the 'replacement' item.

Contractual Attributes: these attributes are aggregate information across all the contracts in the system that use this item, and include information such as the total number of contracts, number of unexpired contracts, total dollar volume across all contracts, total number of disputes, total number of purchase orders, and so forth.

In one embodiment of the CER system, the various transactions related to purchases (POs, invoices, and payments) are monitored as they are created and transferred between the different software systems. When transactions start coming into the application, then a standard process of data validation and data cleaning can be put in place to deal with missing information as and when this occurs. Data validation refers to checking that received information is consistent, in itself or with other information stored. Data cleaning consist of proceeding to minor adjustments to the received data, for example to consolidate supplier names and addresses into canonical forms. To illustrate this, a typical process can occur as follows:

The transaction is identified by the origination source (system), originating department, the transaction type (PO, invoice, etc.). If no transaction type can be determined it is assumed to be a "general" transaction. If a transaction validation issue arises, then a dispute is automatically generated. This is a transaction validation dispute.

Once identified by transaction type, the transaction needs to be validated against its appropriate format and the individual elements of the transaction need to be validated for proper format and simple validation rules (e.g., a string, number, etc.) If a transaction format validation issue arises, then a dispute is automatically generated. This is a format validation dispute.

Once the elements are validated, an associative validation is done regarding its association with contract, PO, or invoice and possibly the supplier and the buyer. This association is then validated against the information in the application. If a transaction association validation issue arises, then a dispute is automatically generated. This is an association validation dispute.

Finally, the line-item information is checked for cleanliness. This is meant to determine if the system is able to match the line-item with an item in the item master. If a transaction cleaning issue arises, then a dispute is automatically generated. This is a cleansing dispute.

The basic information in a transaction includes the timestamp, buyer, the supplier, the contract, and the line items. The supplier information corresponds to that in the procurement system, the line-items correspond to that in the item master, and the contract corresponds to that in the contract management system. From above, the basic operations of the CER system upon recognizing a transaction include: (a) validation of format, (b) cleaning, (c) normalization, (d) de-duplication, and (e) enrichment.

Given an invoice, the CER system needs to validate if a contract exists—this the first compliance issue (maverick buying). The system then needs to validate against the PO and validate if the invoice is optimal given the past transactions and the existing awards allocation and suggest changes to reduce cost. Given a PO the system needs to similarly validate against the contract and determine that pricing is correct. Given that the CER system has the award allocation, as supplied from the sourcing application together with details about expressive bids, along with an association with the buyers, suppliers, items, and the contracts from the other systems, then compliance can be managed without ambiguity within the CER system.

At any stage an issue may arise and someone needs to look at the transaction and make a decision as to what to do. Different users may be involved at different stages based upon their responsibilities. When discrepancies are found, a dispute (or issue) is created and the originator is notified and an owner is assigned to the dispute. An update to the transaction can then be made in the existing procurement system and recognized by the CER system. For example, upon a new dispute being generated by the compliance system, the Buyer could go back into the procurement system and update the PO appropriately. Similarly for invoices, the system can reconcile the non-compliant invoices with the original purchase orders and the award allocations and notify the accounting team. The accounting team can then make appropriate changes in the procurement or accounts payable system until complete. Any time there is a discrepancy in the PO, invoice, or the payment either party may raise a dispute. These disputes need to be tracked and resolved. Each dispute has a potential monetary value (initial value in dispute), actual monetary value (resolved value in dispute), and a time span (time from creation to resolution). All these items can be analyzed to determine the value of the dispute and the value of the dispute resolution system.

In the process of resolving disputes, it might be necessary to update information about the contract with a supplier. For example:

A PO includes an item is not included in a contract, then the user would have the opportunity to add the item into the contract with an effective date and line-item pricing. If the item is associated with any of the contract clauses, they should be identified.

There has been a line item price change, in which case the system can give the user an option to accept the new price with an effective date.

Edits made to contracts must be tracked and audited so that they can be reconciled with prior POs, invoices, or payments. This can be a simple report showing the contract component at the time and the POs affected.

Contract Visibility, Issue Notification and Workflow:

Rather than fully automating all functionality, for example taking actions to alter line-item prices in the procurement system or trigger rebate requests, one embodiment of the CER system will generate notifications for members of a procurement team, for them to then act upon or ignore as deemed appropriate.

For example, there are may be three basic kinds of issues that can occur:

Informational item. An informational item is an issue that is simply information about what the system has done. If a user gets a notification on an information issue, the user does not need to make any action at this time. For example, if a purchase order exceeds a user's spend limit, then an informational issue is created. An information issue could also be generated when a contract is getting close to an aggregate tiered volume discount.

Action item. An action item is an issue that requires the user to do something or verify that what the system has done is correct. For example, this can occur when a PO comes in and the system cannot identify (match) to an existing supplier. The system would create a new supplier with this name and proceed although it may match an existing supplier. The person assigned the action item would need to enter the system and validate as a new supplier or match to an existing supplier.

A special type of actionable issue is a validation issue. A validation issue occurs when the transactions are imported or read into the system. If a transaction fails to be validated against the appropriate EDI standard, cXML, standard, then an issue arises. Another example of an action item, is one that is generated when the monitoring system is cleaning data and there is uncertainty about whether the correct item or the correct contract has been identified.

Dispute item. A dispute item is simply an actionable item that arises in processing a PO, invoice, or payment that has a monetary value to it. This could be a line-item price that does not match, an accessorial is added that should not have been added, and so on. Another example of a dispute issue is when the payments made to a supplier seem incorrect given contract terms.

By leveraging this notification approach, the CER system can be non-invasive in that it does not disrupt or change the process a company has in procuring goods, but can instead be used in conjunction with existing processes and only interjects itself when a discrepancy (or dispute) is found.

As transactions are read, they are validated against the contracts. Validation would include verifying an existing valid contract, verifying that the item is included in the contract, and then validating that the pricing is consistent with the contract, purchase order, invoice, and payment and all of the appropriate combinations. If any errors are found, the originator and owner of the originating system are notified of the issue and it is resolved. Issues need not halt the procurement process, but may instead queued to be acted upon. For example, a cost compliance dispute on an invoice or cost compliance dispute on a payment need not stop the item from being delivered or an invoice to be paid.

This process has the additional benefit of cleaning the data as it flows through the system allowing firms to be always "sourcing ready" with good data to form the basis of a new sourcing event.

Many events may occur during the course of a contracts lifetime (e.g., contract update, contract clause near full utilization, contract clause updated, purchase order created, purchase order updated, etc.) but not all are of the same importance. For this reason, the system can be designed to allow users to view existing notification schemes, create a new notification scheme, edit a notification scheme, delete a notification scheme and associate and disassociate a notification scheme with a contract.

Issues may be tracked through inception to resolution, stored, and searchable throughout the system. Associated with an issue can be information such as its status, the ownership information (current owner and due dates, what is next change should have, when is this change expected, what is the due date for a change), issue creation information, issue resolution information, monetary information (expected savings, actual savings, percent of expected savings), change history and relationships (to associated contracts, POs, invoices, payments, spend category, supplier etc.).

If a transaction that is being processed fails any of the compliance checks, then an issue of the appropriate type is created, an owner assigned (in accordance with the scheme), and appropriate notifications sent out (according to the notification scheme). Notifications can include a link to the notification in the system and if a dispute or an action item, the actions that need to be taken and by when. If no action is taken by the date, then the action item or dispute can be escalated to the contract owner, and then finally to the contract administrator.

A permission scheme can be used to determine which users can see which issues, and users can be provided with a portal (or "dashboard") to track and manage issues and notifications. A user can be provided with the ability to search and view the issues they have access to, based on the type of issue (e.g., date, status, supplier, since last action, by contract or contract clauses, by monetary savings amount, and so on.) A user should also be able to drill down into information about a supplier in regard to issues, for example: summary information on the contracts for a supplier (total number, number expired, contract utilization), summary information on the POs, invoice, and payments by status and amount, summary information on the disputes (total number, number by status, ROI on the disputes, anticipated ROI on the disputes, etc.), along with views of contracts, POs, invoices, payments and disputes.

The issue notification system can be integrated with a workflow system to determine how to route issues. Various parties can include contract administrators (with responsibility to contracts), procurement users (with responsibility to POs and invoices), category managers (with responsibility to spend in a category), supplier managers (with responsibility to supplier relations), and senior management with read-only access. The CER system can generate notification alerts and route to the appropriate person, for example notifying a contract administrator if the spend is close to discount/rebate tiers.

A user may want to generate views of issues in regard to a particular item, including (a) summary information on the contracts for this item (total number, number expired, contract utilization), (b) summary information on the POs, invoice, and payments by status and amount that contain this item, (c) summary information on item pricing (minimum, maximum, average, median), (d) summary information on the disputes (total number, number by status, ROI on the disputes, anticipated ROI on the disputes, etc.), (e) time-series for an item price and metrics such as minimum, maximum, median, average, and various percentile statistics. One embodiment of the system can also allow a user to compare metrics for transactions against historic costs to determine saving, and also access reports to show the transaction volume and costs over the lifetime of the contract.

A user may also view information in regard to a particular contract, for example: summary information about disputes, POs, invoices and so forth; as well as contract utilization information itemized in various ways (overall, by category, by line-item, by contract clause and so forth); and comparisons between contract forecasts and actual procurement volume.

In viewing contract information, a user can in turn perform maintenance tasks in regard to a supplier's item list, and associated line-item pricing, including tiered-pricing by unit volume within an order, tiered-pricing by dollar volume within an order, tiered-pricing by unit volume over the contract term, and tiered-pricing by dollar volume over the contract term. These changes can be made via import/export through formats such as Excel or cXML, or a user interface to a hosted service. When price changes are entered the user can also specify the start date for the price change, which effectively sets the end date for the prior pricing on the line-item. If an existing price is changed this is tracked so that they can be audited and reconciled against POs, invoices, or payments already in the CER system. Similar principles apply for other contract information along with accessorials that can apply to an item or to an order.

Suppliers can also be given access to the monitoring system, for example in order to: (i) view and update their supplier information, which could trigger an action item to a user on a procurement team, (ii) search and view any of their contracts, (iii) search and view any issues against their contracts, (iv) manage and resolve issues assigned to them, and (v) search and view any of their notifications. A supplier could also search across all the disputes by owner and status, as they relate to the supplier, and respond to disputes within the system. In this way, some of the maintenance work performed by the buyer can be usefully shifted to a supplier. A supplier can also be provided with information about where the accumulated procurement quantity in a contract is relative to discount and rebate levels. This can help with dispute resolution by providing improved transparency and provide access to information, for example about market shares as relevant to market-share clauses within a contract.

The CER system described above includes a contract compliance/reconciliation module or a subsystem, a contract execution module or subsystem, and a procurement strategy optimization module or subsystem. These modules can operate independently or collectively to implement the present invention. The function of each of these modules or subsystems will now be described.

Figure 2:
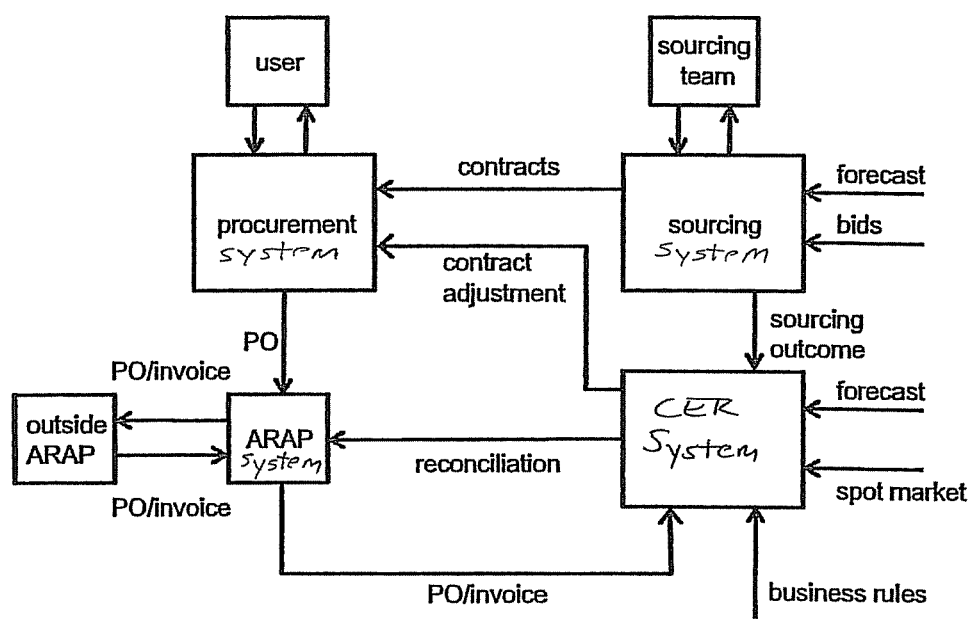
FIG. 2 is a block diagram of a system for implementing contract compliance in accordance with the present invention.
Figure 3:
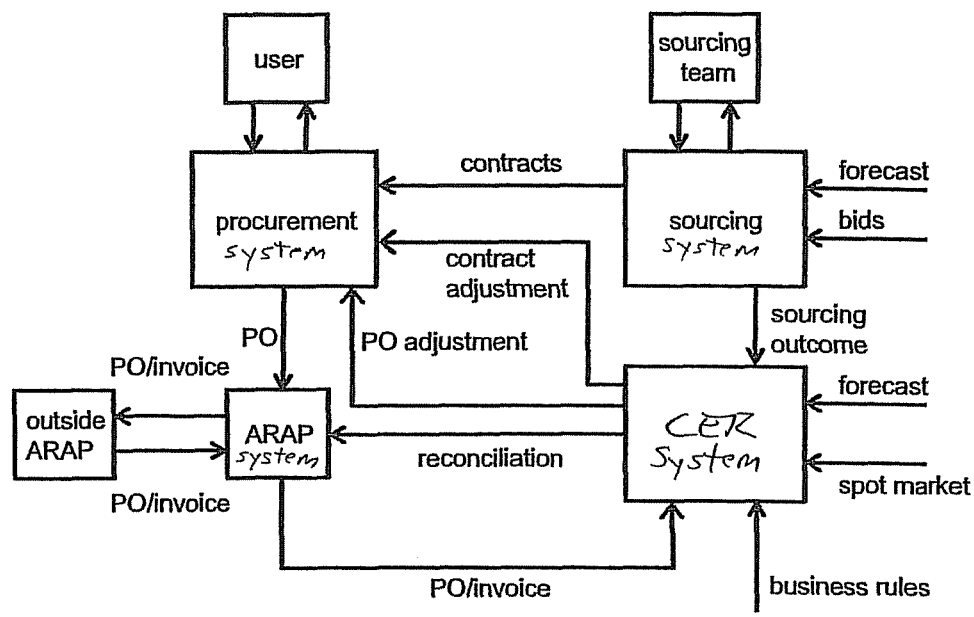
FIG. 3 is a system for implementing contract execution in accordance with the present invention.
Figure 4:
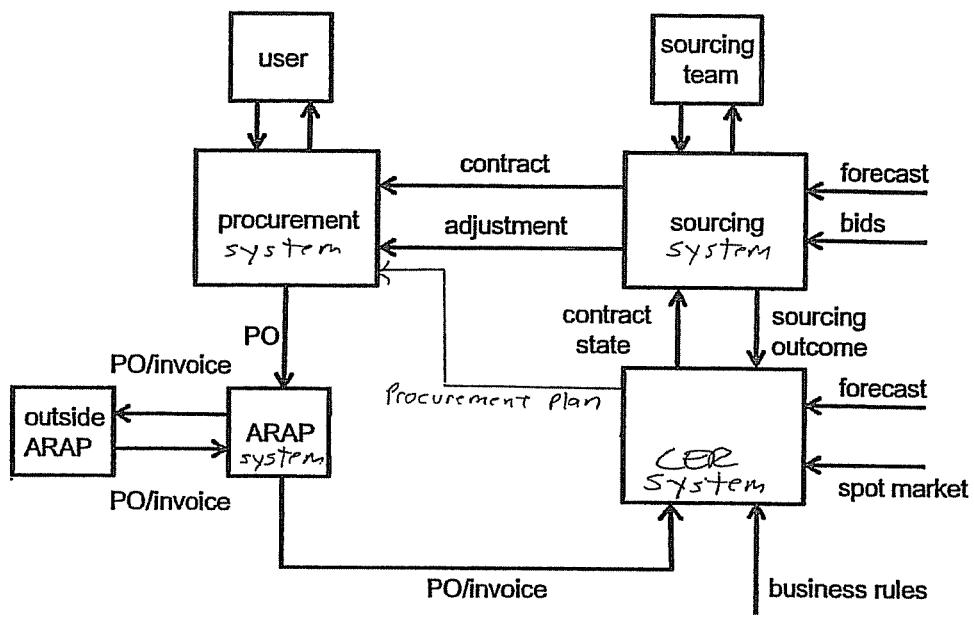
FIG. 4 is a system for implementing reoptimization or procurement strategy optimization in accordance with the present invention.

Enabling Expressive Payment Reconciliation:

FIG. 2 illustrates the use of the CER system for contract compliance through optimal expressive payment reconciliation of payments against aggregate purchases. The contract compliance module or subsystem of the CER system is utilized to realize optimal reconciliation of payments against aggregate purchases. In FIG. 2, a procurement system generates POs that flow to the accounts-receivable/accounts-payable (ARAP) system. The ARAP system is typically connected to the ARAP system of suppliers. As discussed above, it is in response to a PO that an invoice is generated, and then finally a payment is made. There can be a back-and-forth during these steps, until buyer and supplier reach agreement on terms. In FIGS. 2-4, the CER system, the ARAP system, the procurement system, and the sourcing system are shown as separate blocks. However, this is not to be construed as limiting the invention since any one or combination of functions typically performed by any of these systems can be realized in one or more standalone or networked computers 2 of the type shown in FIG. 1. Accordingly, the illustration in FIGS. 2-4 of the CER system, the ARAP system, the procurement system, and the sourcing system as being separate blocks is not to be construed as limiting the invention. For example, two or more of the systems shown in FIGS. 2-4 can be realized in a standalone or network computer 2 wherein each system is realized as a separate module within computer 2. Thus, the description hereinafter of one system monitoring another system, receiving information from the other system, or dispatching information to the other system is to be understood to mean that said monitoring occurs between two or more modules operating on a single computer, like computer 2 shown in FIG. 1.

It should be noted that what systems companies have vary widely, and as a consequence the way the CER system will connect to the other systems in place will too. A few variations are:

- If procurement systems are disparate and the ARAP system does not store POs, but the ARAP system stores all invoices received from suppliers. In this case, the CER system may connect with the ARAP and access the invoicing data, but not the POs.
- The compliance system may retrieve the required data from a data warehouse.
- It can also be that the ARAP stores payment information but not invoices, which may be found in the procurement system. In this case the CER system would have to connect to both systems to get the necessary data.

The compliance subsystem of the CER system monitors the ARAP system and receives information about POs and invoices. This information allows the compliance subsystem to track the state of each contract, e.g., each contract determined from the output of a sourcing system, including the goods (or services) purchased within each PO from each supplier, and the flow of payments made to a supplier. The ARAP system is also used to implement payments in the event that reconciliation is required due to an inconsistency between POs and invoices, invoices and payments, or payments and contracts. This can be achieved through a special-purpose PO/invoice, for example with an appropriate code to signify the purpose, and including any information provided by the compliance subsystem by way of explanation.

The compliance subsystem receives volume forecast information from users or from another system, e.g., the procurement system and/or the sourcing system. These forecasts can be updated at the sourcing or procurement system at any time to reflect improved info nation. Additional inputs to the compliance subsystem may include spot market prices, for example in the case that the contract price is determined by spot market prices.

The compliance subsystem must also receive information about the outcome of the sourcing event, or otherwise about the contracts that are in place with each supplier. The outcome of an expressive sourcing event will typically include (a) quantities of goods to be purchased from each supplier, and (b) all bid information from winning suppliers. It is this latter bid information, including side constraints, volume discounts, and other farms of expressiveness, that defines the agreed upon rules by which payments are to be determined. As discussed above, users of the compliance subsystem will generally be able to upload or transfer economic terms relevant to compliant procurement into the CER system in various forms, and also edit contracts within the CER system.

The CER system can also receive from the sourcing system as input adjustments, side constraints and other infatuation provided by the bid-taker in defining the final scenario that generated the outcome of a sourcing event. This is useful information for making optimal reconciliation decisions in the event that there is a choice to make about which offers to accept, and this choice depends in part on future projected procurement quantities and thus also about the intent in regards to, for example, how to split the allocation across contracts.

The compliance subsystem can also receive information to guide the expressive payment reconciliation process itself. For example, the frequency with which reconciliation should take place and whether decisions to allocate to a particular offer of a supplier should be firm commitments or whether they can be reconsidered later in the procurement process.

All of the above information can be adjusted or replaced at any time by users of the CER system, for example by members of sourcing and procurement teams.

Expressive payment reconciliation needs to handle two kinds of expressiveness:

- single-PO expressiveness (e.g., for a trip from A to B and then back from B to A in the context of transportation).
- across-PO expressiveness (e.g., tiered discounts), which must be reconciled over time via periodic optimization.

Regardless of whether it is single-PO or across-PO, the expressive payment reconciliation always consist of two phases:

- An expressive payment calculation phase, during which the proper payments that would have occurred following the contract clauses errorlessly.
- A comparison and action phase, during which the outcome of the expressive payment calculation is compared against the actual payments made between the contracted parties, and, when a reconciliation action is taken if the two differ. Such an action may consist of initiating a reconciliation payment, or issuing a dispute with a supplier.

In the process of performing optimal reconciliation, the compliance subsystem will also periodically need to update contract information within the procurement system—for example to reflect new price offers that have triggered, and so forth.

We next discuss the two kinds of expressive payment reconciliation problems.

Single PO Compliance:

A pre-cursor to across-order reconciliation is to ensure compliance with payment terms within a single PO.

The basic transaction unit is a PO with an associated ID number and time stamp. Each PO j has an associated supplier ID and contract ID (or contract IDs) and an associated list of triples (k, $Q_k$, $p_k$) to denote the ID number k of the good, the quantity $Q_k$ of the good purchased, and the total payment $p_k$ for that quantity. In the case of a kit (i.e. a pre-packaged set of goods) then this has a unique ID and plays the role of a good. The total payment $p_k$ may be decomposed into a per-unit base price and then additional accessorial charges (e.g., tax, freight and so forth). The total payments $p_k$ per quantity $Q_k$ of good k may also then adjusted by a within-order discount, for example the terms of the contract might include a within-order dollar volume discount that triggers when the total spend is above some amount (within-order multi-item tiered pricing).

This can require checking issues such as:

The accessorial charges are correct.

Any within-order discounts have been correctly provided.

Market prices or catalog prices that provide the price basis are correctly assessed.

For the most part this step does not require the use of optimization but requires checking for conditions of various rules within a contract. For example, perhaps the contract includes a discount of 5% when more the cost of a PO is $10,000 or more. In this case, then the compliance subsystem should check whether the conditions that trigger the discount are valid.

Another example is when there is a package that corresponds to some set of items purchased as individual items: the compliance subsystem should check that the package discount was received by the buyer, if this is allowed as part of the contract. The contract could, alternately, require that the items be purchased as a package for the discount to be available. In the former case, optimization is required to determine the best within-PO price because there could be multiple package-discounts available (or "kits"), and there is a minimal cost set-covering problem to solve to find the optimal kits that cover the items purchased in the PO.

It should be noted that users of current procurement systems often use the following workaround to deal with the system's inability to handle packages properly: they create new SKUs (stock keeping unit, the identifier of a line-item), where one unit of this new SKU correspond to a package containing precisely defined quantities of the items that form the package. The treatment of packages suggested in the previous paragraph is superior for two reasons:

Instead of just very specific quantities, ranges can be used. E.g. "the package prices applies if quantity of A is between 90% and 110% of quantity of B", or "the package prices applies is quantity of A is between 100 and 150 and the quantity of B is between 120 and 170". Capturing this semantics by the mean of new SKUs would require a large number of SKUs, if quantities are whole numbers. If quantities can be any floating point number, then an infinite number of SKUs would be required.

The "new SKU" approach requires the buyer who places the order to proactively recognize there is a package an use the correct SKU. That is, he should send to the supplier a PO that has a line for the package SKU rather than several lines for the various items that constitute the package. Otherwise, the package price would not be used automatically. Even if a user recognizes after the fact that a package could have applied, the vendor may not be willing to charge the package price. With the CER system, buyers need not be proactive.

But to see that, optimization could be required even for this single PO compliance check, perhaps there are a number of different discounts available from a supplier, only one of which can be used, e.g., either $200 off, or 5% off, or 10% off items in group A when at least 100 items in group B are purchased, and so forth. In this case, the compliance subsystem should check each discount and determine which has the best value and make sure that the lowest payment was made to the supplier. More complex still, perhaps multiple offers can be used at once but they are interconnected—such as, "if you spend $1000 in total then you are eligible for a 5% discount" but then other dependent offers such as "spending at least $300 on items in group A provides a discount of 10% on items in group B" where taking the first discount precludes the second discount because the total spend is then below $300 on items in group A.

Optimal Across-Order Reconciliation:

For the purpose of optimal reconciliation, assume now that the payments within each PO are correct and have been reconciled if incorrect. These adjusted payments provide the input to the compliance subsystem.

What remains is reconciliation in regard to discounts and other adjustments that apply on the basis of aggregate purchases across multiple POs. During sourcing the buyer will identify the different goods that it intends to purchase during the term of a contract, and associate an anticipated quantity with each kind of good. These goods may then play a role, often within aggregated groups (e.g., when triggering multi-item conditional unit volume discounts), in determining the expected cost at the outcome of a sourcing event.

For each PO there is an associated list of triples (k, $Q_k$, $p_k$)—where $p_k$ is adjusted to account for any percentage discount associated with the PO—and a PO can have also an associated lump-sum discount. A PO also has a unique ID, a supplier ID, a list of associated contract IDs and a time stamp, as above. This information combines to provide the total state of each contract for the purpose of optimal across-order reconciliation.

Note that maverick buying, i.e. off-contract buying, is not relevant in optimal reconciliation which considers only the correctness of payments given the procurement decisions that have been made.

The basic step of optimal expressive payment reconciliation considers the current state of each contract, as reflected by the sequence of POs that have been executed against each contract. In addition, the above information such as forecast quantities and other bid-taker information may be considered as part of the reconciliation process.

The appropriate granularity of state information depends on the content of contracts. In its simplest form, all that is required is the total quantity purchased of each kind of good from a supplier during the term of the contract and then the total payment made. The payment should be adjusted to reflect the contracted terms—for example, the contract may specify the base price and adjustments to the base price and independent of accessorials which apply to each PO (and are already verified.)

Given the total quantity purchased of each good, and the details of the contract with a supplier, then an optimization problem can be formulated to determine the minimal total payment consistent with the goods purchased. The generic foam of this optimization problem is:

minimize total payment subject to (i) quantities allocated to contract=actual quantities purchased (ii) logic of offers and discounts respected Given that optimization was used for winner determination during sourcing, this is essentially the same optimization problem except that the quantity is adjusted from the total projected quantity to reflect instead the current quantity purchased, and the information about buyer (or bid-taker) constraints and adjustments is neglected because that affects decision making about the outcome of sourcing—and is relevant also to optimal execution—but is not relevant in optimizing payments given procurement decisions already made. The other major difference is that this is a single supplier optimization problem because we are optimizing payments against a single supplier, rather than deciding which of a set of prospective suppliers to pick.

The optimization problem can handle complex discounts where the trigger is on one set of goods and the discount applies to another, and other forms of complex expressiveness such as mutually-exclusive offers where one but not all can be accepted.

In the event that the total payment is different from the total payment made to the supplier, then one approach is to apply a threshold (e.g., 5%) and whenever the total payment is more than 5% outside of its correct amount trigger a reconciliation payment from buyer to supplier or vice versa, together with an explanation (from the outcome of the optimization) as to which offers should have triggered.

Some contracts may include sequencing constraints on offers. For example, an offer might state "once you have purchased 1000 units of item A, then you will receive a 5% discount on future purchases of item B." In this case, additional information is required to reflect the state of the contract over-and-above simply the total quantity of purchases. Specifically, the sequencing across POs is also an important part of the input because this is necessary to determine the correct total payment. But again, in the case that the contract was evaluated within the sourcing system then the same optimization problem can be used for reconciliation except that the quantities purchased are as currently committed and not based on projections.

This reconciliation process is myopic in that it considers the current state and acts as though the current procurement state is the final procurement state. The offers within contracts are considered and optimized against, payments optimized, and a reconciliation is made.

Myopic reconciliation is a good strategy when the reconciliation process does not require commitment; i.e., if earlier POs can be reassigned to alternate offers at any time then there is no need to consider the future and it is a reasonable strategy to simply reconcile greedily and take the optimal offers given this "null" assumption about the future.

Forward-looking Across-Order Reconciliation:

On the other hand, the expressive payment reconciliation process might itself have semantics that are agreed upon by buyer and supplier. For example, it should happen monthly and once elements of contracts are activated (e.g, offer 1 vs. offer 2) then that decision cannot be changed and offer 1 but not offer 2 will be active into the future. In this case, it is no longer optimal to be myopic and reconciliation should instead be forward-looking and consider forecast procurement volumes and also buyer (or bid-taker) constraints and adjustments.

For example, suppose there are two package offers in the original contract: offer 1 applies to purchases of equal quantities of (A,B) with saving of $1 over line item prices, offer 2 applies to purchases of equal quantities of (A,C) with saving of $10 over line item prices. Only one offer can be accepted and once committed the offer cannot be changed. Note that these package of goods do not need to be purchased simultaneously within a single PO but can be purchased across time. Suppose that the firm purchases both A and B in month 1 and at the end of the month the compliance subsystem myopically accepts the first offer. But then the demand for A continues but the demand for B drops and the demand for C picks up. With hindsight, or if reconciliation had not occurred in month 1, it would now be best to take offer 2 rather than offer 1.

The problem could be avoided with a reliable forecast at the end of month 1 that quantities of C but not B will be purchased in the future. The problem could also be avoided if reconciliation was simply delayed until the end of the term of the contract, but this might not be allowed within the agreed upon terms of reconciliation (perhaps it must be monthly) or undesirable for other reasons (the flow of discounts is delayed.) The problem would also be avoided if reconciliation did not require commitment to an offer.

But in general it serves to illustrate the need for forward-looking, optimal reconciliation that is guided by volume forecasts.

It is also noteworthy that whereas for myopic reconciliation, it is sufficient to consider each supplier in isolation and optimize the terms of its contract, for forward-looking reconciliation it may also be necessary to consider all contracted suppliers. This is because the correct offer to take with supplier 1 can depend on the offers in place with another supplier, and the strategic intent of the buyer in terms of how to split the procurement allocation across suppliers.

The simplest form of forward-looking, optimal expressive payment reconciliation is an optimization problem very similar to that solved in strategic sourcing. There are basic consistency requirements for the problem to be well defined:

The state of each contract must be consistent with the long-term forecast for quantity of each good to be purchased, e.g., it should not be that 1000 units of good A are forecast but more than this amount of good A have already been purchased in total from the suppliers.

The state of each contract should be feasible given the side-constraints detailed by the sourcing team; e.g., it cannot be that the sourcing team specified that 50% of spend go to supplier 1 and 50% to supplier 2 when more than 60% of projected total spend has already been allocated to supplier 1.

The users of the compliance subsystem need to receive feedback when these basic consistency requirements fail and be able to adjust the information until it is consistent.

In contrast, note that it is expected that the state of a contract in regard to the total payment made might be impossible given the rules of a contract. For example, the total payment might be incorrect given the discounts that should have triggered. Of course this is expected, and exactly the problem that is addressed through periodic reconciliation against contracts that is performed to resolve any such discrepancy.

There is then a well-defined optimization problem, formulated as:

minimize total payment
subject to
(i) total quantity allocated to each contract>=total quantity purchased
(ii) total quantity allocated across all contracts=total projected quantity
(iii) logic of offers and discounts respected
(iv) logic of buyer adjustments and constraints respected The decision variables define an allocation of spend to each supplier and also determine which offers, discounts and adjustments are active in the solution. This problem is defined over all contracts from all suppliers.

The solution to the optimization problem will indicate a set of discounts that will be accepted from each supplier, including a determination for example of when the price charged for each unit changes as a result of a quantity discount.

Based on this set of discounts, as a post-processing step the compliance subsystem then:
(a) determines which offers from the optimal forward-looking solution are already activated based on current spend; and
(b) determines the total payment that should have been made to each supplier on the basis of these offers For step (a), for example it might be determined that the buyer should leverage offer 1 but on the other hand this could be a volume discount that will only trigger when some future quantity of spend is satisfied. For step (b), for example it might be that a trigger for a price discount has already been met and therefore the price should be discounted appropriately.

In the case that the semantics of reconciliation require periodic commitment to which offers are accepted, then an additional set of constraints that would be included in the optimization are: subject to respecting earlier decisions about which offers to activate.

Other constraints might also be included in such an optimization problem to better reflect future procurement decisions. For example, perhaps it is useful to include "smoothing constraints" to preclude a future procurement plan that is external in first making all purchases from one supplier and then switching and making all purchases from a second supplier. This would be an unrealistic future strategy, for example, in the case that both suppliers are contracted to mitigate risk against supplier failure.

Additional Considerations:

The step of optimal expressive payment reconciliation may occur periodically (e.g., once per month), be triggered by a user of the compliance subsystem, or be automatically triggered when based on some other determination (e.g., based on the quantity (dollar or volume) of purchases that have been committed since the last reconciliation step). In part, the decision about when to reconcile may be a tradeoff between receiving rebates quickly on one hand but being able to take advantage of additional procurement information on the other hand.

When reconciliation is non-myopic, for example because of the requirement to commit to offers as they are accepted, then the reconciliation problem could also be formulated and solved as a problem of stochastic optimization, with uncertainty about volume projections explicitly considered within decision making.

Other variations depend on the semantics of a contract. For example, a contract could provide a 20% discount on goods of type A if a certain volume is met, and this could have the semantics that the 20% discount can be taken even before the volume threshold is met but rather in anticipation based on the total contracted volume. In this case the offers that are active based on projected quantities can be leveraged against current spend, even if the current spend is not itself sufficient to trigger the offers.

Correct payment expressive payment reconciliation thus places a new emphasis on the "execution-semantics" of contracts: the semantics should make this kind of distinction clear, i.e. is the discount available based on actual procurement quantity or based on projected quantity. A related example is described above for the case of within-order compliance, i.e. if a discount is available on a package of goods (A, B and C) then can it also be realized even if the goods are purchased as separate items but within the same PO? This should be made clear in the execution semantics of a contract; e.g., when generating contracts based on the outcome of a sourcing event.

The compliance module can also provide some broad visibility about its past action. For example, it may be that a particular seller is issuing incorrect invoices more often than other sellers. In this case, identifying this seller has value, so the problem can be investigated. It would be natural, for one embodiment of the compliance module of the CER system, to allow the user access information about, for example:

the average value of single-PO reconciliation payment for a particular supplier;
the frequency of POs or invoices associated with a particular supplier that require a reconciliation payment;
the frequency and average value of reconciliation payments related to a particular good or service; and
the frequency and average value of reconciliation payments related to a particular user that created the PO.

In forward-looking expressive payment reconciliation, the forecast for the quantities to purchase of a contract may be generated from a less detailed forecast, containing information about the expected quantities of goods or services across several contracts, and a procurement plan. Then one can forecast the quantities to be purchased from a given contract by computing the quantities that would be purchased out of this contract by executing the procurement plan to make the purchase of the less detailed forecast.

Enabling Optimal Execution and Procurement Strategy Benchmarking:

FIG. 3 illustrates the use of the CER system for optimal contract execution and procurement strategy benchmarking. More specifically, the contract execution module or subsystem of the CER system is utilized to address the problem that exists because of inexpressive procurement systems and myopic procurement decisions.

It should be noted again that maybe variations are possible, and are dictated by the architectures of the other systems run by the buyer. All the variants discussed in section 6 related to the architecture enabling expressive compliance applies here too.

The contract execution subsystem is able to dynamically interpose itself into the procurement process through either a feedback loop identified as "PO adjustment" in FIG. 3, or by providing a way to turn purchase request into purchase orders. A purchase request is a request to purchase some goods or services that is internal to the buying company. Often, it does not specify any supplier. Turning purchase requests into a purchase orders mean identifying what suppliers to use for the requested items. On the other hand, in the case of PO adjustment, the contract execution subsystem receives POs that are complete (in particular, they have a named supplier), but that have not yet been sent to the supplier. In this case, the contract execution subsystem may counter-propose an alternate supplier or an alternate offer from a supplier when this is projected to lead to savings in the long-run by triggering volume discounts. Similarly, the contract execution subsystem may counter-propose that a buyer selects items in packages rather than individually, in order to trigger a package discount.

By monitoring contract state and inter-posing in the procurement process, seeking to modify procurement decisions in order to (a) better comply with the outcome of strategic decision making during sourcing, and (b) achieve lower total procurement cost during the term of a contract the contract execution subsystem provides more expressive procurement. Rather than just handling line-item prices and single-PO discounts, the effect is that the procurement system is also aware of long-term, multiple-PO offers and discounts. Correct leveraging of such long-term offers requires forecasts, optimization and also constraints and adjustments from the sourcing subsystem, in order to guide long-term strategy.

An alternate architecture would combine the procurement system and the contract execution subsystem system into a single, integrated, expressive procurement system. This invention is not limited to the particular system architecture in FIG. 3. Rather, that is one possible embodiment and many other colocations of logical modules or subsystems are possible.

Upon identifying a potentially suboptimal procurement decision, the contract execution subsystem can intervene in different ways. One possible intervention is a simple notification in order to provide information about the potential for long-term saving by a different procurement decision. This could be strengthened by, for example, keeping track of decisions made that go against the recommendation, and also forcibly requiring an alternate decision by replacing the PO with an adjusted PO.

Single-Order Optimal Execution:

Most of the problems with contract execution occur because of the lack of visibility into long-term (across-order) forms of bid expressiveness such as volume discounts that trigger based on aggregate purchases. But there are also potential execution problems that can be determined on a single-order basis. Adopting a single-order basis means that neither the forecast volumes nor strategic decisions as represented by the outcome of a sourcing event come into consideration. Rather, the consideration is in regard to the goods purchased in the current PO and whether or not a better price can be obtained.

For example, the current PO could include items purchased individually when they are available as a kit. In this case, an optimization problem can be formulated:

minimize total payment
subject to
(i) total quantity of goods purchased≧quantity in PO
(ii) purchasing from the same supplier
(iii) logic of offers and discounts respected
where the utilization of kits and other simultaneous-purchase discounts will be automatically considered. The contract execution subsystem could either intervene directly and adjust the PO, or more likely suggest an alternate PO for consideration by the buyer. The current state of the contract is considered in this decision because it determines the current prices available from the supplier (e.g., volume discounts may have already been reached based on aggregate, across-order purchases).

In a simple variation, the contract execution subsystem can also facilitate increased savings by performing price-optimization across multiple contracts, with alternate suppliers considered, and allowing the solution to be a split allocation across multiple suppliers.

Forward-Looking Optimal Execution:

In addressing the problem of myopic procurement against the current state of contracts, the main functionality is to provide forward-looking, optimal execution. By considering the forecast volume and strategic decision(s) reflected in the outcome of sourcing, the system can avoid myopic, suboptimal procurement. For example, while it could be optimal to purchase items from supplier 1 in the short-term this might preclude the leveraging of a volume discount in the long-term. Alternately, perhaps it is optimal to purchase items from supplier 1 in the short-term but this does not comply with a split allocation decision requirement input into the sourcing system by a sourcing team which intended to also leverage a contract with a more expensive supplier in order to mitigate risk in the supply chain.

In addition to defining the prices available under each contract for future purchases, the state of each contract is an important input to the problem of optimal contract execution because one reason to use supplier 1 over supplier 2 could be because additional purchases provide a retrospective discount against purchases already completed. For example, one offer from a supplier could be "if you buy more than 1000 units of A then every unit is discounted by 5.

Given a PO, the system determines the optimal suppliers and offers to use to purchase these goods given future projections and the sourcing strategy as reflected in the outcome of the sourcing event, and also provides the procurement team with a revised PO or set of POs (in the case of multiple suppliers) together with projected savings on this PO and projected long-term savings. It is possible that the projected saving on this PO is negative, either because the long-term savings exceed the short-term increase in cost or because the short-term increase in cost is justified in meeting the sourcing strategy such as a required for a split allocation across multiple suppliers.

The same basic consistency considerations as outlined for the problem of optimal reconciliation are relevant here. For example, the state of each contract must be consistent with the long-term forecast of goods to be purchased and also with the side-constraints and adjustments as specified by the bid-taker at the outcome of the sourcing event (including requirements about split allocations). The user of the contract execution subsystem can make adjustments in order to achieve these consistency properties when they fail to hold.

Given basic consistency, the problem of optimal execution can be solved as a first optimization problem, formulated as:

minimize projected total payment over the term of the contracts subject to:
(i) total quantity allocated to each contract≧total quantity purchased
(ii) total quantity allocated=total projected quantity
(iii) logic of supplier offers and discounts respected
(iv) logic of buyer adjustments and constraints respected
(v) smoothness constraints The objective is defined over the entire history, including the cost of past purchases. This is important when retrospective discounts may become available in a way that is contingent on future purchases. The total quantity purchased in constraint (i) does not include the current PO. Rather, this quantity is reflected as part of the total projected quantity (i.e., current committed purchases plus projected future volume.) This problem should optionally also include the constraint to respect earlier decisions about which offers to activate, in the case the reconciliation against offers requires commitment.

The smoothness constraints can be introduced to preclude a future procurement plan that is extreme in first making all purchases from one supplier and then switching and making all purchases from a second supplier. This would be an unrealistic future strategy, for example, in the case that both suppliers are contracted to mitigate risk against supplier failure. One way to achieve this is to require a procurement trajectory that tracks (perhaps within configurable guidelines) the final anticipated allocation split. That is, if the total quantity purchased of item A should be optimally allocated 50% to supplier 1 and 50% to supplier 2, then for some set of intermediate "way points" the allocation split should be within ±2% of this final split. The number of way points can be configurable.

A second augmented optimization problem is then solved, in which constraint (i) is adjusted so that the total quantity purchased is as would exist if the current PO was executed as currently proposed. This is one place in which basic consistency is required—it must be that the problem is at least feasible if the current PO was committed, i.e., the resulting state of each contract must still meet hard constraints provided by suppliers and the bid-taker during the sourcing event.

Solving this second optimization problem provides the following information:

Projected savings on this PO: The difference between the cost for the PO as determined in the second optimization problem and the cost as determined in the first optimization problem. In computing this cost difference, any projected long-term savings as they accrue to this PO should be factored (e.g., if a future volume threshold will trigger a retrospective saving of 5%, then this should be considered as part of the projected cost of the current PO).

Projected long-term savings: The difference between the total cost as deter mined in the second optimization problem and the total cost as determined in the first optimization problem.

Revised PO (or POs): The solution to the first PO will define which supplier(s) and which offer(s) should be utilized for the quantities as reflected in the current PO.

A number of variations on this basic approach are possible. For example, the first optimization problem could be modified to make it costly, or impossible, for the counter-proposed PO to be very different from the current PO either by a cost penalty in the objective or through side constraints.

Procurement Strategy Benchmarking:

Going hand to hand with optimal execution is the benchmarking of the past procurement decisions, called procurement strategy benchmarking. Indeed, procurement strategy benchmarking consist of computing, with the benefit of hindsight, the best execution of the past actual purchases. The inputs needed by the CER systems are the same as for execution, with in addition information about the flexible elements of the past purchases. The procurement strategy benchmarking then computes a new, fake, history of purchase transaction that differ from the actual one only by the flexible elements.

The amount of flexibility can vary. For example, one can restrict the changes to be only about which supplier was chosen for particular POs. More flexibility is given if, in addition, it is allowed to order items that were purchased within the same PO from different suppliers, or, reciprocally, to bundle items that were purchased the same day, but from different supplier, within the same PO. Even more flexibility is given if the purchase of each item is allowed to be shifted slightly in time—maybe it is allowed to anticipate purchases by a day or two, or to postpone them by a day or two, or both.

Comparing the cost of the actual execution with these hindsight optimized execution allows the procurement team to measure their performance. A large difference may be explained by a poor procurement plan or a poor execution against this plan.

Enabling Procurement Strategy Optimization:

FIG. 4 illustrates the use of the CER system for procurement strategy optimization. More specifically, the procurement strategy optimization subsystem of the contract execution subsystem includes a feedback loop to the sourcing system, so that within procurement strategy optimization (and additional sourcing) can be performed within the sourcing system. The outcome of procurement strategy optimization by the procurement strategy optimization subsystem provides an update to the procurement system through an adjustment to the current sourcing outcome determined by the sourcing system.

It should be noted again that maybe variations are possible, and are dictated by the architectures of the other systems run by the buyer. All the variants discussed in section 6 related to the architecture enabling expressive compliance applies here too.

Basic Procurement Strategy Optimization:

The basic functionality provided by the procurement strategy optimization subsystem is to allow for periodic reoptimization of the outcome of sourcing system. Whereas the current status quo in sourcing is to optimize an allocation and determine an outcome upon completion of the bidding process, the procurement strategy optimization subsystem of the CER system allows for revisions to this strategic decision.

Recall that the outcome of sourcing by the sourcing system defines (i) an allocation of goods to each supplier, (ii) a set of bid-taker constraints and adjustments, and (iii) all bid information from winning suppliers, including conditional discounts and other expressive offers. Expressive sourcing via the sourcing system is typically an interactive process wherein the bid-taker explores a number of different scenarios (changing adjustments and side constraints) until settling on an outcome.

The contract execution subsystem of the CER system allows for procurement strategy optimization within the sourcing system. The basic idea is to provide the current state of each contract along with adjusted forecasts of future needs, and to allow the sourcing system under the control of a sourcing team to determine a new outcome consistent with the bids from winning suppliers. This can be done without collecting additional bids, with the decision reflecting a reconsideration of how to allocate future procurement across the existing set of winning suppliers.

The optimization problem used to guide procurement strategy optimization will be a variant on the standard problem solved by the sourcing system because: (i) it will contain committed quantities to suppliers based on the current state of each contract, and (ii) it will reflect adjustments to payments already made to suppliers on the basis of the allocation decisions, e.g., if discounts that trigger apply retrospectively to already completed procurement.

The basic problem will be formulated as:

minimize projected total payment over the term of the contracts subject to:

(i) total quantity allocated to each contract≧total quantity purchased (ii) total quantity allocated=total projected quantity (iii) logic of supplier offers and discounts respected, where any adjustments to payments already made to suppliers are captured by including existing procurement against contracts within the decision problem (together with constraint (i) to ensure consistency of this decision with that already committed).

There are possible variations of the previous optimization problem. For example, the objective function may be altered to take into account more than simply the payments to the suppliers. For example, adjustments may be made (i.e., the payments are modified to favor or penalize some suppliers). Also, the value of the goods may differ depending on what supplier or contract they are purchased from, for example because different internal processing are needed. One variation is that the objective function is the net value to the buyer of the plan, that is, the value of the received items minus the cost needed to purchase and process them.

The sourcing system, under the control of the sourcing team, can then adjust both the total projected quantity and the logic of buyer adjustments and constraints (including logic to reflect loss of good will or penalties for not meeting terms of current contracts) before determining a revised outcome.

One decision that could be taken is to close out a relationship with a supplier altogether and thus save on the ongoing cost of maintaining such a relationship. Upon conclusion of procurement strategy optimization, the outcome would be re-imported into the procurement system and one or more subsystems of the CER system as deemed suitable and/or desirable.

The sourcing system can also be provided with additional forms of expressiveness in guiding reoptimization, for example allowing the sourcing team to input into the sourcing system express preferences for not violating existing contracts (but instead respecting volume commitments) through side constraints or other adjustments. Penalties for violating existing contracts may be real and set by the supplier, rather than to simply reflect the loss of good will. For example, these penalties could be a flat fee, a percentage of what was already spent, or a percentage of the cost of still committed quantities that will not be purchased. Alternatively, a contract could have a clause that allows for no penalty if 60 days notice is provided, and this can be factored within the optimization by providing for a continued allocation to this supplier to represent an additional 60 days of ongoing procurement.

An additional opportunity provided by procurement strategy optimization is to consider changes to spot market prices. That is, the spot market always provides an alternative to negotiated contracts and should be factored in when deciding which contracts to go with in the first place, when to void an existing contract and incur a penalty, and when to re-contract. A simple approach is to model the prices in the spot market at any point in time as static and with infinite supply liquidity. Given this, then the spot market can be factored into the procurement strategy optimization process by modeling the spot market as an alternate supplier. A more sophisticated variation is to also seek to model the stochastic nature of prices in the spot market, and consider the option value of a contract when deciding whether to enter into a new contract.

Continual Sourcing:

A simple modification can also allow for continual sourcing, wherein the sourcing function elicits new bids from suppliers or considers a new, unsolicited offer that has been received from a supplier.

Whereas the above optimization problem considered only the winning suppliers from the previous event, or other pre-existing contracts, the problem formulation can be modified to allow for an allocation to a new supplier or to reflect a new offer received from an existing supplier.

In the event that a new supplier is accepted, or a new offer from an existing supplier is accepted, then information about the next contract—once finalized—should be imported into the procurement system and contract compliance subsystem of the CER system.

Support for Contract Negotiation and Re-negotiation:

As a side benefit, the same optimization methodology can also provide support for negotiation by providing the sourcing system with a break-even price for an offer for a new supplier. This can alternately allow for contract renegotiation with an existing supplier.

While retaining information about the state of each contract, existing offers, and any penalties in regard to breaking existing contracts, an augmented optimization problem can be formulated to include as a side constraint that a new supplier becomes part of the allocation. For example, the side constraint might require that 10% of the future volume of goods of type A be allocated to this new supplier. The difference between the total cost of this augmented problem and the cost of the original problem then reflects the current cost difference of going with the new supplier.

The current cost difference can then be post-processed to enable a quote by the supplier. For example, if the current cost difference is $10,000, then this can be divided in a dollar-weighted amount to the individual goods that compose the proposed allocation to the new supplier. For example, if the total proposed dollar spend to the new supplier is $100,000, then this reflects a requirement of a price improvement of 10% which could go proportionately to the entire proposed allocation. Alternately, the sourcing system can provide the sourcing team with the ability to specify preferences such as "what if 80% of the short-fall is to be made up from a price reduction on goods of type A and 20% on goods of type B" and this can, in turn, trigger a proposal for how to adjust the prices across different goods.

For the purpose of negotiation, the sourcing team might then not simply quote these kinds of break-even price adjustments back to a supplier but rather look for adjustments that provide a 5%, 10% or so forth price improvement and also for the purpose of strategic negotiation. The important benefit is to provide visibility for strategic decision making of this kind by a sourcing team.

Enablement: A Typical Network Architecture:

The CER system can be hosted and delivered "on-demand" as an ASP model or installed on a client's platform. A typical architecture will require a multi-tiered application that can scale on each tier and load-balancing with at least two servers on each tier. A database that supports clustering could be employed, or otherwise a master-slave configuration adopted though the vendor or the operating system.

In one embodiment, the tiers would be:

Web Application Tier: This tier is a clustered solution that load balances requests across all the servers. There will not be many users of the system and their front-end analysis will not have extremely high load. Using standard technologies this is either a J2EE application or a .NET application. If a J2EE application, it can be run on any J2EE compliant application server such as JBoss, SAP NetWeaver or IBM WebSphere.

Authentication Tier: This tier is responsible for user authentication and group-role permissions. If using Microsoft, then Active Directory is appropriate, if Java, then Lightweight Directory Access Protocol (LDAP) is preferred. There are a variety of LDAP servers, including open source OpenLDAP, Sun LDAP, Fedora Directory Server, or Netscape Directory Server.

Remote Application Tier: This tier will be doing most of the analytic work and monitoring the procurement transaction networks. Requests will be processed across all the nodes and results published and notifications sent. This tier must be fault tolerant. Using standard technologies, this tier should use a queuing or messaging service such as Java Messaging Service (JMS). It must also support web services and AJAX requests.

Transaction Tier: This tier is responsible for processing all the transactions including reading, cleaning, and so on, and also EDI and cXML transactions.

Reporting Tier: This tier is responsible for generating user reports.

Database Tier: This tier is responsible for storing all the data used throughout the system. It should be a clustered solution to protect against loss of data. Using standard technologies, this needs to be accessible by JDBC or ODBC and to support a clustered solution with triggers, stored procedures, views, and referential integrity. Examples include MySQL, PostgreSQL, along with support for Oracle and IBM DB2 through a JDBC or ODBC layer.

The CER system will need to integrate with or may incorporate other ancillary systems, such as:

Identity Management System: a system that contains identity information for people to log in to the application. Most companies have an authentication system where user credentials are stored. Passwords must abide by corporate standards and this is all managed within this system.

Contract Management System: a system that holds the master contracts across the entire organization including the item master and supplier master. This system is primarily used for document management of the contract through legal in order to get them signed and executed.

E-Sourcing System: a system that is used to source the goods and services. At the end of a sourcing event, a contract is created so that the purchasing group can purchase goods off of the contract. There is a need to integrate to this system because the Contract Management System may not be able to capture all of the expressive offers and capacity limitations agreed to in the sourcing negotiation.

Transaction Network: a system that forms the underlying network across all the procurement systems. Integrating with the transaction network eliminates the need to integrate with multiple different procurement systems such as those provided by SAP, Ariba, and so forth.

The invention has been described with reference to preferred embodiments. Obvious modificatons and alterations will occur to others upon reading and understanding the preceding detailed description. It is intended that the invention be construed as including all such modifications and alterations insofar as they come within the scope of the appended claims or the equivalents thereof.

The invention claimed is:

1. A computer-implemented method of conducting expressive payment reconciliation for a buyer against expressive contracts on goods or services comprising:
(a) storing in computer storage accessible to a processor of a computer data associated with a purchase transaction, wherein the purchase transaction data includes information about at least the following:
a seller; and
a set of at least one good or service, each of which has a quantity associated therewith;
(b) the processor identifying a first contract against which the purchase transaction is made and a first payment amount for the purchase transaction;
(c) storing in computer storage data about the first contract, wherein this data specifies at least the following: at least one good or service, a payment rule to determine the payment for the purchase of at least one quantity of at least one good or service, information about a plurality of purchases made against the contract, and a trigger condition and associated effect, wherein the trigger condition is responsive to the information about the plurality of purchases, and the effect causes one of the following: a payment to occur, a payment associated with the purchase transaction in step (a) to change, a future payment to change, a future payment contingent on a future purchase transaction to change, or a constraint on allowable purchases to change;
(d) based on the purchase transaction data in step (a) and the data about the first contract in step (c), the processor determining a second payment amount for the purchase transaction; and
(e) in the event that the first payment amount and second payment amount are different, and in response to the processor automatically approving a reconciliation action subject to one or more predetermined rules or the processor receiving an external approval of a reconciliation action, the processor taking one of the following actions:
storing in the computer storage a modified invoice with a modified payment amount;
storing in the computer storage a reconciliation payment equal to the payment difference;
outputting over a computer network an explanation of the modified payment; and
outputting over a computer network a dispute notification.

2. The method of claim 1, wherein at least part of the data stored about the purchase transaction in step (a) is based on at least one of the following sources:
a purchase order;
an invoice;
a bill of lading; and,
a record of payment.

3. The method of claim 1, wherein the trigger condition in step (c) includes at least one of the following:
the volume quantity of at least one good or service, summed over a plurality of purchase transactions associated with the first contract exceeds a quantity threshold;
the monetary value of at least one good or service, summed over the payments of each of a plurality of purchase transactions associated with the first contract exceeds a value threshold, where the payment in a purchase transaction is specified in a purchase transaction or determined by the payment rule associated with the first contract;
the volume quantity of a first set of at least one good or service, summed over a first plurality of purchase transactions associated with the first contract, when calculated as a fraction of the volume quantity of a second set of at least one good or service, summed over a second set of at least one purchase transaction, exceeds a fractional-quantity threshold; and
the monetary value of a first set of at least one good or service, summed over a first plurality of purchase transactions associated with the first contract, when calculated as a fraction of the monetary value of a second set of at least one good or service, summed over a second set of at least one purchase transaction, exceeds a fractional-value threshold.

4. The method of claim 1, wherein the effect associated with the trigger condition of the first contract includes at least one of the following:
a one-time payment due by the buyer to the seller associated with the first contract or from the seller associated with the first contract to the buyer;
a one-time payment between the buyer and the seller associated with the first contract, where the amount and due date of this payment are responsive to the history of purchases made in connection with the first contract;
a one-time payment between the buyer and the seller associated with the first contract, where the amount and due date of this payment are responsive to the history of purchases made in connection with the first contract, and to external data that is available to both the buyer and the seller and whose origin is specified within the first contract, a modification of the payment for future purchases on at least one good or service;

a modification of the payment for future purchases on at least one good or service, where the modification is responsive to the payment amount for the good or service when the trigger condition is satisfied, and responsive to the history of purchases made in connection with the first contract;

a modification of the payment for future purchases on at least one good or service, where the modification is responsive to the payment amount for the good or service when the trigger condition is satisfied, and responsive to the history of purchases made in connection with the first contract, and to external data that is available to both the buyer and the seller and whose origin is specified within the first contract;

a modification of the payment to be made for a purchase transaction that is associated with the trigger condition.

5. The method of claim 4, wherein the external data is a price index, a tariff, or a financial index.

6. The method of claim 1, where the trigger condition and associated effect associated with the first contract is one of the following:
   an across-order multi-item dollar-volume anticipated discount;
   an across-order multi-item dollar-volume state based discount;
   an across-order multi-item dollar-volume rebate;
   an across-order multi-item quantity-volume anticipated discount;
   an across-order multi-item quantity-volume state-based discount;
   an across-order multi-item quantity-volume rebate;
   an across-order multi-item market share anticipated discount;
   an across-order multi-item market share state-based discount;
   an across-order multi-item market share rebate;
   an across-order multi-item growth-based anticipated discount;
   an across-order multi-item growth-based state-based discount; and
   an across-order multi-item growth-based rebate.

7. The method of claim 1, where in addition, in step (d), storing in computer storage, and determining a second payment amount for the purchase transaction that is in addition responsive to, a first forecast of a future quantity of at least one good or service to be purchased against the first contract.

8. The method of claim 7, wherein the trigger condition and associated effect stored in computer storage and associated with the first contract in claim 5 step (c), is one of the following:
   an across-order multi-item dollar-volume anticipated discount,
   an across-order multi-item quantity-volume anticipated discount,
   an across-order multi-item market share anticipated discount,
   an across-order multi-item growth-based anticipated discount,
and where in step (d), in determining a second payment for the purchase transaction that is responsive to the forecast of a future quantity of at least one good or service to be purchased against this first contract, the payment for the current transaction depends on whether or not the trigger condition for a discount or tiered price is forecasted to occur before the end of the term of the contract.

9. The method of claim 7, where the processor determines the first forecast of a future quantity of at least one good or service to be purchased against the first contract by:
   storing in computer storage data about a set of at least one additional contract, distinct from the first contract, where the data includes information about at least a seller and at least one good or service,
   storing in computer storage a second forecast of the future quantity of at least one good or service to be purchased,
   storing in computer storage a first procurement plan for future procurement against at least one of the first contract and set of at least one additional contracts,
   and responsive to the procurement plan and to the second forecast of the future quantity of at least one good or service to be purchased, a processor determining the first forecast of the future quantity of at least one good or service to be purchased against the first contract.

10. The method of claim 7, where in addition, the processor selecting a first plan for future procurement in a way that is responsive to the data about the first contract and the set of at least one additional contract, and to the forecast of the future quantity of at least one good or service to be purchased.

11. The method of claim 9, where the procurement plan includes at least one of the following:
   a target quantity for at least one good or service to be purchased in connection with a contract during a time interval;
   a target quantity fraction for at least one good or service to be purchased in connection with a contract during a time interval relative to all purchases of the same or substitutable good or service;
   a target monetary amount for at least one good or service to be purchased in connection with a contract during a time interval;
   a target monetary amount fraction for at least one good or service to be purchased in connection with a contract during a time interval relative to all purchases of the same or substitutable good or service;
   a specification of at least one purchase order such that in the event that the purchase order occurs then procurement against a particular contract is mandatory;
   a specification of at least one purchase order such that in the event that the purchase order occurs then procurement against a particular contract is recommended;
   a specification of a plurality of purchase orders and an alternation, such that in the event that the plurality of purchase orders occurs, then procurement of each purchase order against an alternation between a plurality of contracts is mandatory; and
   a specification of a plurality of purchase orders and an alternation, such that in the event that the plurality of purchase orders occurs, then procurement of each purchase order against an alternation between a plurality of contracts is recommended.

12. The method of claim 10, where the selection of the first plan for future procurement is in addition responsive to at least one business rule that is stored in computer storage.

13. The method of claim 1, wherein the first contract is generated in a sourcing event in which a plurality of sellers compete through a bidding process to enter into contracts with the buyer for future procurement of at least one good or service.

14. The method of claim 12, wherein the at least one business rule that is stored in computer storage is selected by a computer in a way that is responsive to the business rules used by the buyer within a sourcing event in which a plurality of sellers compete through a bidding process to enter into contracts with the buyer for future procurement of at least one good or service.

15. The method of claim 10, wherein the selection of the first plan for future procurement is in addition responsive to at least one of the following:
- the current value or a forecast on the future value for the spot price for at least one good or service,
- the current value or a forecast on the future value of external data that is available to both the buyer and the seller of at least one contract, where the external data is specified within the contract.

16. The method of claim 15, wherein the external data is a price index, a tariff, or a financial index.

17. The method of claim 12, wherein the selection of the first plan for future procurement is made by the processor outputting a candidate plan and receiving a first business rule in response and selecting the first plan in a way that is responsive to this first business rule.

18. The method of claim 1, wherein the first contract identified in step (b) is generated in a sourcing event in which a plurality of sellers compete through a bidding process to enter into contracts with the buyer for future procurement of at least one good or service.

19. The method of claim 1, wherein at least part of the data stored about the first contract in step (c) is based on at least one of the following sources:
- a supplier master list;
- an item master list;
- an supplier item price catalog; and
- an index price.

20. The method of claim 1, wherein the information included in the data associated with the purchase transaction in step (a) is based on at least one of the following:
- data validation; and
- data cleaning.

* * * * *